US012682068B2

(12) United States Patent
Chase et al.

(10) Patent No.: US 12,682,068 B2
(45) Date of Patent: Jul. 14, 2026

(54) METHOD AND SYSTEM FOR SECURELY DEPLOYING AN ARTIFICIAL INTELLIGENCE MODEL

(71) Applicant: Robust Intelligence LLC, San Jose, CA (US)

(72) Inventors: Harrison Chase, San Francisco, CA (US); Kojin Oshiba, San Francisco, CA (US); Yaron Singer, Menlo Park, CA (US)

(73) Assignee: Robust Intelligence LLC, San Jose, CA (US)

( * ) Notice: Subject to any disclaimer, the term of this patent is extended or adjusted under 35 U.S.C. 154(b) by 347 days.

(21) Appl. No.: 17/681,548

(22) Filed: Feb. 25, 2022

(65) Prior Publication Data

US 2022/0269796 A1    Aug. 25, 2022

Related U.S. Application Data

(60) Provisional application No. 63/153,667, filed on Feb. 25, 2021.

(51) Int. Cl.
| | |
|---|---|
| *G06F 21/57* | (2013.01) |
| *G06F 21/31* | (2013.01) |
| *G06F 21/32* | (2013.01) |

(52) U.S. Cl.
CPC .......... *G06F 21/577* (2013.01); *G06F 21/316* (2013.01); *G06F 21/32* (2013.01); *G06F 2221/033* (2013.01)

(58) Field of Classification Search
CPC ...... G06F 21/316; G06F 21/32; G06F 21/577; G06F 2221/031; G06F 2221/033; H04L 63/1416; H04L 63/1433; H04L 63/1466
See application file for complete search history.

(56) References Cited

U.S. PATENT DOCUMENTS

| | | | | |
|---|---|---|---|---|
| 11,361,100 B1 * | 6/2022 | Gates | ..................... | G06N 5/043 |
| 2009/0327132 A1 * | 12/2009 | Diev | ..................... | G06Q 40/00 705/44 |

(Continued)

FOREIGN PATENT DOCUMENTS

| | | |
|---|---|---|
| JP | 2020-91653 A | 6/2020 |
| WO | 2019/202436 A1 | 10/2019 |

(Continued)

OTHER PUBLICATIONS

Grosse et al. "On the (Statistical) Detection of Adversarial Examples" [Online], 2017 [Retrieved on: Aug. 1, 2024], www.arxiv.org, Retrieved from: < https://arxiv.org/pdf/1702.06280 > is related to detection of adversarial examples. (Year: 2017).*

(Continued)

*Primary Examiner* — Eric W Shepperd
(74) *Attorney, Agent, or Firm* — Baker Botts L.L.P.

(57) ABSTRACT

Methods and systems for securely deploying an artificial intelligence (AI) model. The system can identify one or more deficiencies of the AI model, and protect the AI model from being attacked by external data based upon the identifying. The system can be used for fraud detection based on tabular data, voice authentication, facial recognition, object detection, or a combination thereof.

20 Claims, 19 Drawing Sheets

700

Identifying one or more deficiencies of an artificial intelligence (AI) model 300 ⟋ 710

Protecting the AI model 300 from being attacked by external data 400 based upon the identifying ⟋ 720

(56) References Cited

U.S. PATENT DOCUMENTS

| | | | | |
|---|---|---|---|---|
| 2016/0162802 A1* | 6/2016 | Chickering | ............ | G06N 20/00 |
| | | | | 706/12 |
| 2019/0163666 A1* | 5/2019 | Cakmak | .................... | G06N 5/02 |
| 2019/0347410 A1* | 11/2019 | Kesarwani | ............ | G06F 16/903 |
| 2019/0349333 A1 | 11/2019 | Pickover et al. | | |
| 2019/0362072 A1* | 11/2019 | Kesarwani | ............ | G06F 21/552 |
| 2020/0082097 A1 | 3/2020 | Poliakov | | |
| 2020/0151505 A1 | 5/2020 | Saito et al. | | |
| 2020/0167471 A1* | 5/2020 | Rouhani | ............... | G06F 21/554 |
| 2020/0169570 A1* | 5/2020 | Kleymenov | ........ | H04L 63/1416 |
| 2021/0089957 A1* | 3/2021 | Ermans | ................ | G06N 3/0464 |
| 2021/0209512 A1* | 7/2021 | Gaddam | ............ | H04L 63/1408 |
| 2021/0279336 A1* | 9/2021 | Cmielowski | ........... | G06N 3/045 |
| 2021/0303695 A1* | 9/2021 | Grosse | ..................... | G06N 3/08 |
| 2021/0319113 A1* | 10/2021 | Cheng | ..................... | G06N 3/045 |
| 2021/0326652 A1* | 10/2021 | Hazard | ................... | G06N 5/045 |
| 2022/0083571 A1* | 3/2022 | Schmidt | ................ | G06F 16/285 |
| 2022/0141251 A1* | 5/2022 | Richards | ............ | H04L 63/1425 |
| | | | | 726/22 |
| 2022/0351614 A1* | 11/2022 | Nakaguma | ........... | G08G 1/0137 |
| 2023/0004647 A1* | 1/2023 | Okada | .................... | G06N 20/10 |
| 2023/0325678 A1* | 10/2023 | Fradkin | ................. | G06N 20/20 |
| | | | | 706/25 |

FOREIGN PATENT DOCUMENTS

| | | | | | |
|---|---|---|---|---|---|
| WO | | 2019224612 A1 | 11/2019 | | |
| WO | WO 2020/142110 A1 | | 7/2020 | | |
| WO | WO-2022083624 A1 * | | 4/2022 | ........... | G06F 18/214 |

OTHER PUBLICATIONS

Office Action in JP2023535844, mailed Jul. 17, 2024, 16 pages.

Lin, Jing, et al., "Robust Machine Learning against Adversarial Samples at Test Time", ICC 2020—2020 IEEE International Conference on Communications (ICC), IEEE, Jun. 7, 2020 (Jun. 7, 2020) pp. 1-6, XP033798017 [retrieved on Jul. 24, 2020] the whole document.

Yuan, Xiaoyong, et al., "Adversarial Examples: Attacks and Defenses for Deep Learning", Jul. 7, 2018 (Jul. 7, 2018), XP055725582, Retrieved form the Internet: URL:https://arxiv.org/pdf/1712.07107. pdf [retrieved on Aug. 27, 2020] the whole document.

Office Action in CA3204311, mailed Oct. 1, 2024, 5 pages.

Japenese Office Action corresponding to Japanese Patent Application No. 2023-535844 (with English Translation), dated Mar. 12, 2025, 9 pages.

Israel First Examination Report corresponding to Israel Patent Application No. 303460, dated Oct. 28, 2025, 4 pages.

Canadian Examination Report corresponding to Canadian Patent Application No. 3,204,311 dated Sep. 9, 2025, 6 pages.

* cited by examiner

700

710

Identifying one or more deficiencies of an artificial intelligence (AI) model 300

720

Protecting the AI model 300 from being attacked by external data 400 based upon the identifying

100

100

METHOD AND SYSTEM FOR SECURELY DEPLOYING AN ARTIFICIAL INTELLIGENCE MODEL

CROSS-REFERENCE TO RELATED APPLICATIONS

This application claims priority to U.S. Provisional Application Ser. No. 63/153,667, which was filed Feb. 25, 2021, the disclosure of which is hereby incorporated by reference in its entirety and for all purposes.

FIELD

The disclosed embodiments relate generally to artificial intelligence (AI) and more particularly, but not exclusively, to a method and system for securely deploying an AI model.

BACKGROUND

Artificial Intelligence (AI) is becoming a ubiquitous technology in many industries. The benefits of automation, however, can easily mask the vulnerabilities inherent to AI, and current AI development practices often expose organizations to systemic risks. Although research in AI is making giant leaps forward, security and reliability of AI technology are being left behind. "AI attack" has arisen in the market as a new type of data attacks. Unlike traditional cyberattacks that are caused by "bugs" or human mistakes in code, AI attacks are enabled by inherent limitations in the underlying AI algorithms that cannot be easily detected or fixed. AI vulnerabilities mean that, rather than spending effort developing the core AI capabilities of the organization, data science teams are spending precious development cycles coming up with ad hoc solutions to address the myriads of vulnerabilities associated with using AI.

AI technology has been under attack in early ways such as email spam, financial fraud, or even fake account creation. Beyond these applications however, the adoption of AI, automated attacks, and the practices of the industry in recent years make AI security an even more urgent problem. For example, AI is rapidly expanding into industries outside of major consumer tech companies. Securing against spam and click fraud was once a problem unique to large internet services providers, but now is a problem of every business such as banks, insurance companies, governments. Further, methodologies for attacking AI systems are rapidly advancing. Fraudsters are now executing algorithmic attacks on AI. Those attacks are automated, enabling fraudsters to counteract defensive updates much more quickly. Those attacks can be used not only to spoof the AI models, but also to steal sensitive user data or information about the AI systems. Still further, emerging trends in the AI industry include many developers and researchers making their state-of-the-art "pre-trained" models and datasets publicly available, and many companies relying on crowdsourcing to collect and label their data. Such trends make it substantially easier for fraudsters and adversaries to spread "malware" models or contaminate the data used for model development.

In view of the foregoing, there is a need for an improved system and method for secure deployment of AI models that overcome the drawbacks of existing solutions.

Figure 1:
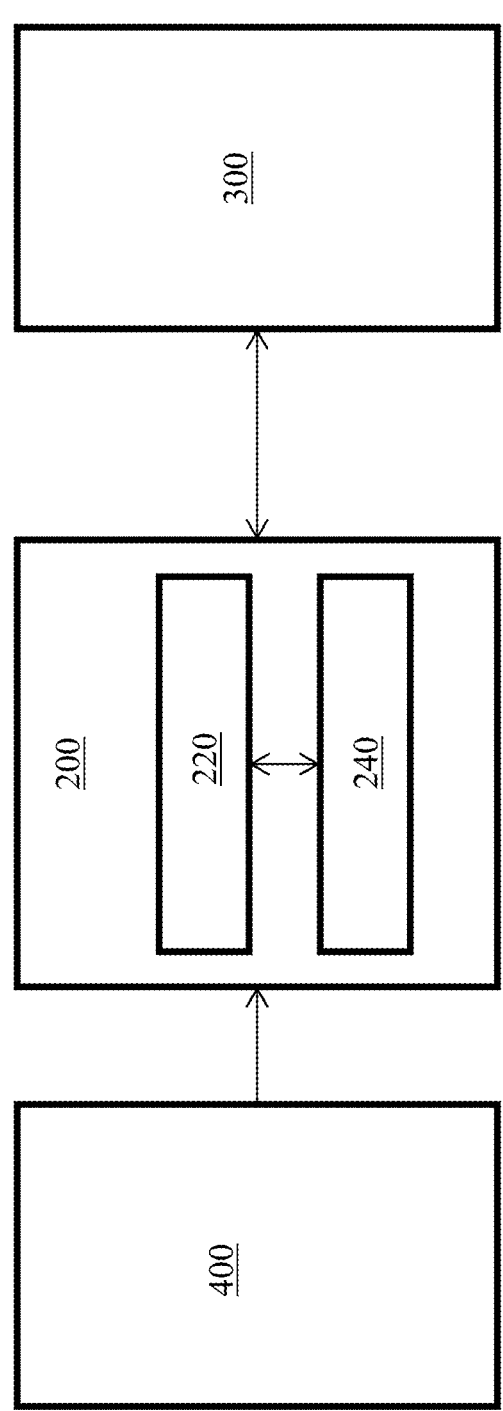
FIG. 1 is a diagram illustrating one exemplary embodiment of a model security system for securely deploying an AI model in an AI operation environment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Machine learning (ML) algorithms have been used to defend against attacks on commercial AI platforms. Machine learning algorithms are better in some cases than human review and rule-based methods which were employed by earlier organizations. However, existing machine learning techniques have limited capacity for defending AI models because of a lack of flexibility and comprehensiveness, a lack of large training data sets, and poor awareness of connections within data and data feeds. More specifically, existing ML models have disadvantages of being very sensitive to underlying changes in real-world data distribution draft and/or data concept drift. Existing ML models have further disadvantages of being very sensitive to errors in data that are inevitable in systems that are highly complex. The lack of research in those fields as set forth above makes commercial AI systems vulnerable to exploits.

A solution to existing security threats to a commercial AI system is needed that includes understanding how a fraud detection system requires a nearly continuous set of testing to patch exploits that may be discovered by experimentation or partial knowledge of the commercial AI system. Unfortunately, most conventional AI systems are not designed to be fraud proof and are often unable to be flexible enough to catch and block other exploits as they occur. And many of the AI system exploits revolve around small perturbations across a number of independent data feed(s) rather than a single data feed exploit. Data feed(s) generally have a number of interconnections to help detect subtle fraud manipulations.

Because currently-available systems and methods for deploying AI models are incapable of detecting vulnerabilities of the AI models and incapable of effectively defending against AI attacks, an improved system and method for securely deploying an AI model that can overcome the drawbacks as set forth above can prove desirable and provide a basis for a wide range of applications, such as active defense of commercial AI from attacks, fraud detection for (or protecting fraud detection AI models of) financial and/or ecommerce companies, biometrics-based authentication, object-detection for security systems and/or autonomous vehicles, and the like.

FIG. 1 is a schematic diagram of a model security system 200 for securely deploying an AI model 300 in an AI operation environment 100. The AI model 300 can include one or more computer-implemented mathematical algorithms that are trained using data and/or human expert input to replicate, based upon information, a decision that an expert would make when provided that same information. An exemplary AI model 300 can include, but is not limited to, expert systems, case based reasoning, behavior based artificial intelligence, evolutionary computation, classifiers, a statistical model, a probabilistic model, a neural network, a decision tree, a hidden Markov model, a support vector machine, fuzzy logic, a Bayesian classifier, or any combination thereof.

The model security system 200 is shown as including a model assessment engine 220 and a firewall 240. The model assessment engine 220 can be configured to identify one or more deficiencies (and/or vulnerabilities) of the AI model 300. Stated somewhat differently, the model assessment engine 220 can determine data that can attack the AI model 300. Attacking the AI model 300 can include deceiving the AI model 300. Stated somewhat differently, attacking can include tricking the AI model 300 into making a decision that is erroneous, that recognizes fraudulent data as non-fraudulent data, that recognizes synthetic (or fabricated, or manipulated) data as authentic data, or a combination thereof. An attack can include data configured to attack the AI model 300. In one embodiment, the model assessment engine 220 can output a report summarizing vulnerabilities of the AI model 300.

The firewall 240 can protect the AI model 300 from being deceived by external data 400 based upon the deficiencies identified by the model assessment engine 220. The external data 400 can include any data that would be inputted into the AI model 300 if the firewall 240 is not established. Stated somewhat differently, the firewall 240 can patch loopholes identified by the model assessment engine 220 to create an additional layer of security that stands between the external data 400 and the AI model 300. In some embodiments, the firewall 240 can generate an alert upon detecting an attack in the external data 400. In various embodiments, the firewall 240 can have an ability to flag the external data 400 as errant or suboptimal in some way. Additionally and/or alternatively, the firewall 240 can flag errors in the external data 400 by automatically profiling the training data that the AI model 300 was trained on. Thus, any of the external data 400 that appear outside of the distribution of the training data can be identified. Additionally and/or alternatively, the firewall 240 can flag the external data 400 that the AI model 300 is less likely to provide correct predictions for. Additionally and/or alternatively, the firewall 240 can provide suggestions to users for remedial actions to improve the performance of the AI model 300 in response to the profile of the external data 400.

In some embodiments, the model security system 200 can be at least partially driven by an application programming interface (API) and be inserted into a data feed of the external data 400 preceding the AI model 300. The model security system 200 can return and/or output data that are clean and free of exploitation to the AI model 300. In various embodiments, the AI model 300 can be untouched and/or unaltered. Advantageously, the model security system 200 can protect the AI model 300 without an extensive update of the AI model 300.

Although FIG. 1 shows the model assessment engine 220 and the firewall 240 as being separate units for illustrative purposes only, the model assessment engine 220 and the firewall 240 can be at least partially integrated and/or combined, without limitation. For example, the model assessment engine 220 and the firewall 240 can each be implemented on computer hardware, firmware and/or software. Accordingly, the model assessment engine 220 and the firewall 240 can be implemented as coded instruction stored on one or more computer systems. The coded instruction associated with the model assessment engine 220 and the firewall 240 can be of separate and/or integrated programs, and the model assessment engine 220 and the firewall 240 are not necessarily implemented on separate hardware.

Figure 2:
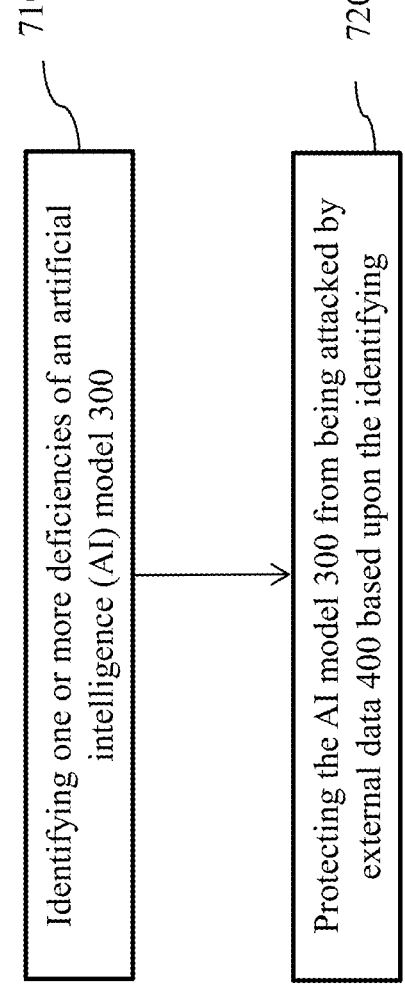
FIG. 2 is a flow chart illustrating one exemplary embodiment of a method for securely deploying the AI model using the model security system of FIG. 1.

Turning to FIG. 2, an exemplary method 700 for securely deploying the AI model 300 is shown. One or more deficiencies of the AI model 300 can be identified at step 710. In various embodiments, the model assessment engine 220 (shown in FIG. 1) can implement the step 710.

The AI model 300 can be protected, at step 720, from being attacked by the external data 400 (shown in FIG. 1) based upon the identifying at the step 710. In various embodiments, the firewall 240 (shown in FIG. 2) can implement the step 720. Advantageously, the protection by the firewall 240 can be customized for the AI model 300 and thus be effective. In comparison with existing vulnerability assessment tools, the model assessment engine 220 can measure the vulnerability of ML models to a greater extent, and comprehensive suite of stress tests of the model assessment engine 220 can test far more edge cases and identify far more weaknesses in the AI model 300.

Figure 3:
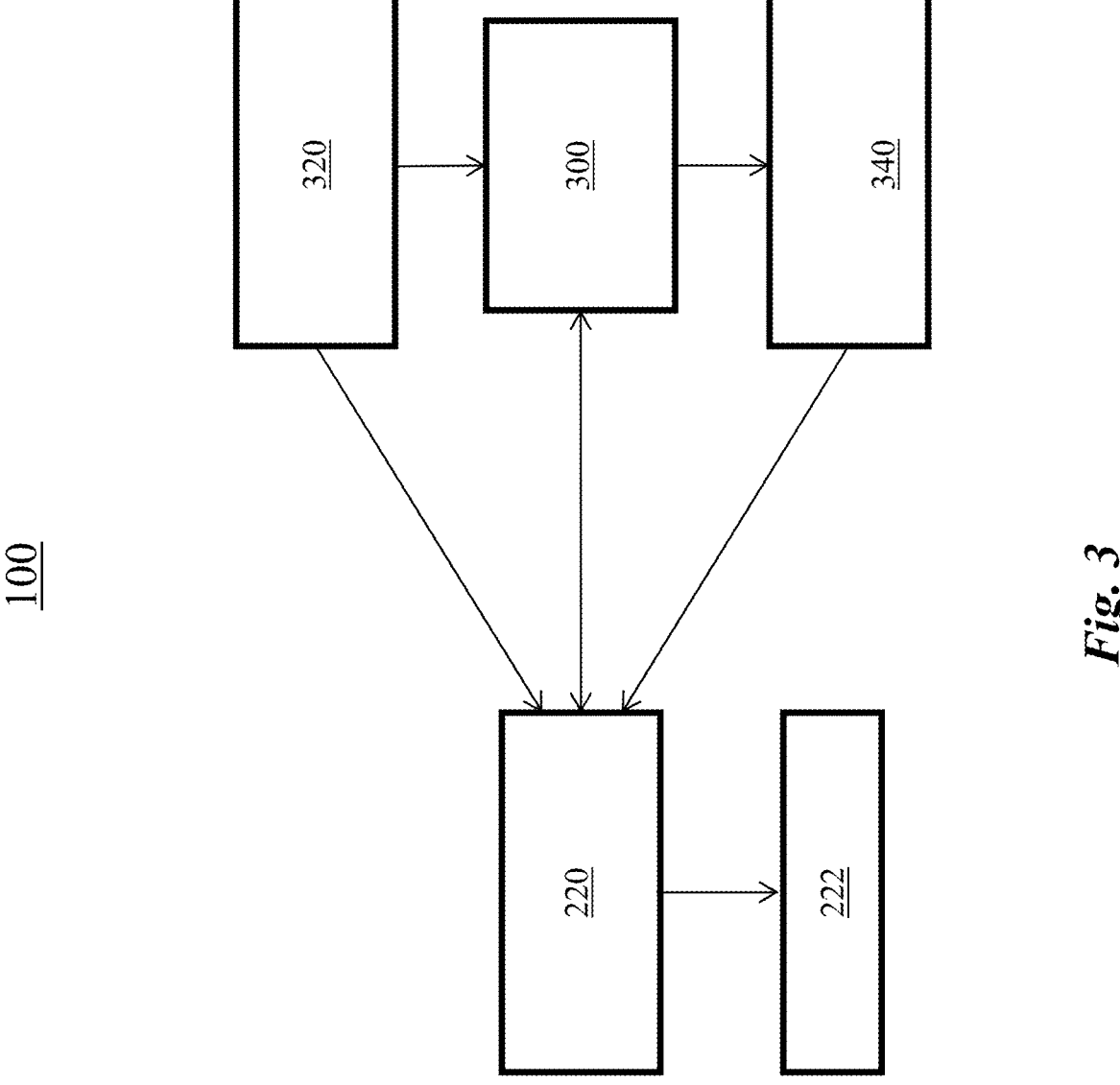
FIG. 3 is a diagram illustrating an alternative exemplary embodiment of the system of FIG. 1, wherein the system includes a model assessment engine for receiving sample input data.

Turning to FIG. 3, an exemplary diagram illustrating operation of the model assessment engine 220 is shown. In some embodiments, the model assessment engine 220 can determine simulated attack data 222. The simulated attack data 222 can include any data that can attack the AI model 300. The model assessment engine 220 can output the simulated attack data 222 to a human operator (such as an engineer and/or data scientist) and/or computer system.

The model assessment engine 220 is shown as receiving sample input data 320 and sample output data 340 each being associated with the AI model 300. The sample input data 320 can include any data that are inputted into the AI model 300 during trial and/or actual use of the AI model 300. Exemplary sample input data 320 can include tabular data, biometric data, audio files, face images, object images, and/or the like. The sample output data 340 can include data that include a decision of the AI model 300 based upon the sample input data 320. Exemplary sample output data 340 can include a conclusion of whether the sample input data 320 is fraudulent or not, a label (and/or classification) indicating a person associated with the audio file and/or face image, objects (and locations thereof) that are detected within the object image, and/or the like.

Additionally and/or alternatively, the model assessment engine 220 can obtain access to the AI model 300 such that the model assessment engine 220 can directly interact with the AI model 300 for a thorough analysis including, for example, inputting specific data into the AI model 300 to expose vulnerabilities of the AI model 300. For example, the model assessment engine 220 can obtain a black-box and/or API access to the AI model 300. The black-box access can include an access that permits the model assessment engine 220 to examine the functionality (such as input and output), without accessing internal structures or workings, of the AI model 300.

In various embodiments, the model assessment engine 220 can determine the simulated attack data 222 at least partially based upon the sample input data 320 and sample output data 340. In one embodiment, the simulated attack data 222 can include at least a portion of the sample input data 320. Stated somewhat differently, the model assessment engine 220 can identify the sample input data 320 that can attack, and/or has attacked, the AI model 300. In another embodiment, the model assessment engine 220 can generate the simulated attack data 222 that is not a part of the sample input data 320.

In one embodiment, the model assessment engine 220 can simulate one or more attacks on the AI model 300 using the simulated attack data 222. Thus, the model assessment engine 220 can confirm that the simulated attack data 222 can successfully attack the AI model 300. In one example, the model assessment engine 220 can input the simulated attack data 222 into the AI model 300 to analyze, based on output of the AI model 300, whether and/or how the simulated attack data 222 attacks the AI model 300. In another example, the model assessment engine 220 can input the simulated attack data 222 into a substitute model (not shown) that is a surrogate of the AI model 300 to analyze, based on output of the substitute model, whether and/or how the simulated attack data 222 attacks the AI model 300. In another embodiment, the model assessment engine 220 can determine the simulated attack data 222 without necessarily inputting into the AI model 300 or the substitute model.

In various embodiments, the model assessment engine 220 can use parallel attacks for combinatorial algorithms. For example, some attacks can include combinatorial algorithms, which is non-deterministic polynomial-time (NP) hard. The model assessment engine 220 can solve the problem of combinatorial algorithms by using parallelization. In one embodiment, the model assessment engine 220 can implement a test that can actively change multiple feature values at the same time for a sample of data points (in the simulated attack data 222 and/or the sample input data 320, for example) to estimate the impact of encountering such changes in production (for example, in interaction with the external data 400).

In various embodiments, as set forth above, the model assessment engine 220 can use substitute models for attacks. Stated somewhat differently, the model assessment engine 220 can at least partially replicate the AI model 300 that can be under simulated attacks.

In various embodiments, the substitute models can be used as a corrective lens. Stated somewhat differently, the model assessment engine 220 can improve and/or customize the AI model 300. For example, the model security system 200 filters the incoming data fed into, and/or wrap about, the AI model 300 and do additional labeling and then use those labels to train a model that can be better than the AI model 300. In other words, the model security system 200 provides a logic filter to sort through incoming data and notify users. Additionally and/or alternatively, the model security system 200 can make changes to the incoming data and notify users.

In various embodiments, the model assessment engine 220 can use reference model detection. In various embodiments, the model assessment engine 220 can establish baselines of model performance and training data profiles (ranges, types, etc). By using the baselines, the model security system 200 and/or a human operator can compare the performance of multiple AI models 300 to determine the best one for production deployment.

As previously described, fraudsters often attempt to trick the AI model 300. Thus, fraudsters and developers create a constantly-evolving game of "cat and mouse." Stated somewhat differently, a fraud detection company produces the AI model 300. Although fraudsters are stopped at first, they eventually can circumvent it. The fraud detection company retrains the AI model 300 to catch the new type of fraud: fraudsters are once again stopped and must work again to circumvent it. The model assessment engine 220 can advantageously be a unique solution of AI model assessment to discover vulnerabilities in the AI model 300 before fraudsters do, enabling the AI model 300 to safeguard against future types of attacks.

Figure 4:
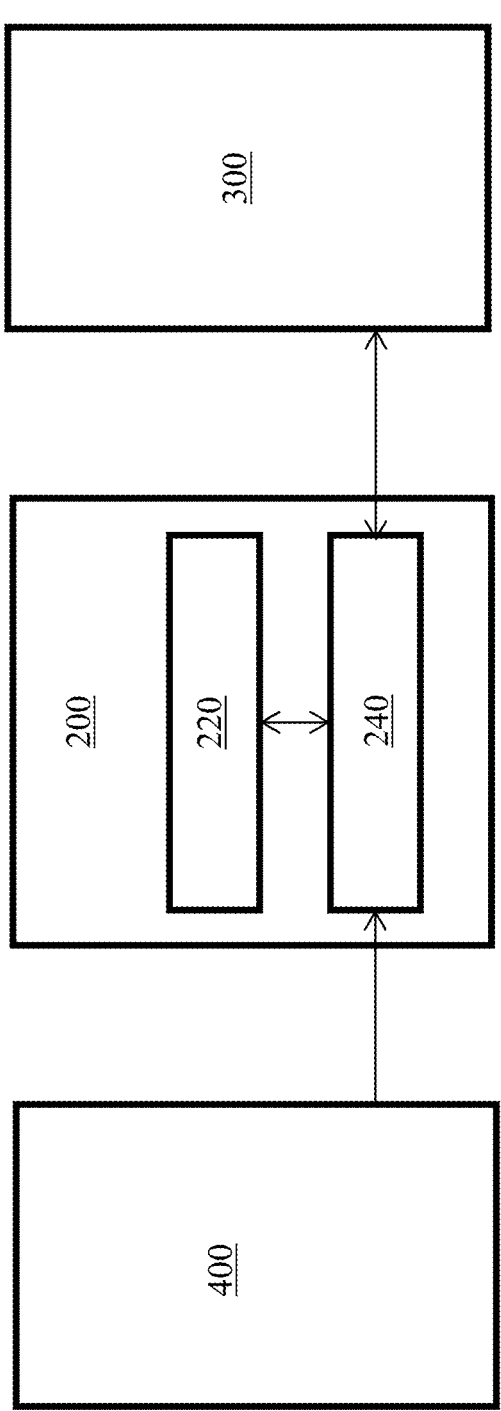
FIG. 4 is a diagram illustrating another alternative exemplary embodiment of the system of FIG. 1, wherein the system includes a firewall for receiving external data.

Turning to FIG. 4, further details of the AI operation environment 100 are shown. The firewall 240 can defend the AI model 300 from attacks of the external data 400. For example, the firewall 240 can determine whether the external data 400 is manipulated to deceive the AI model 300.

In various embodiments, the firewall 240 can defend the AI model 300 by detecting similar data requests. Stated somewhat differently, the firewall 240 can block malicious users based on behavioral patterns of queries on the AI model 300.

In various embodiments, the firewall 240 can use max entropy method for detecting attacks. Stated somewhat differently, the firewall 240 can create multiple detectors and aggregate response thereof.

Figure 5:
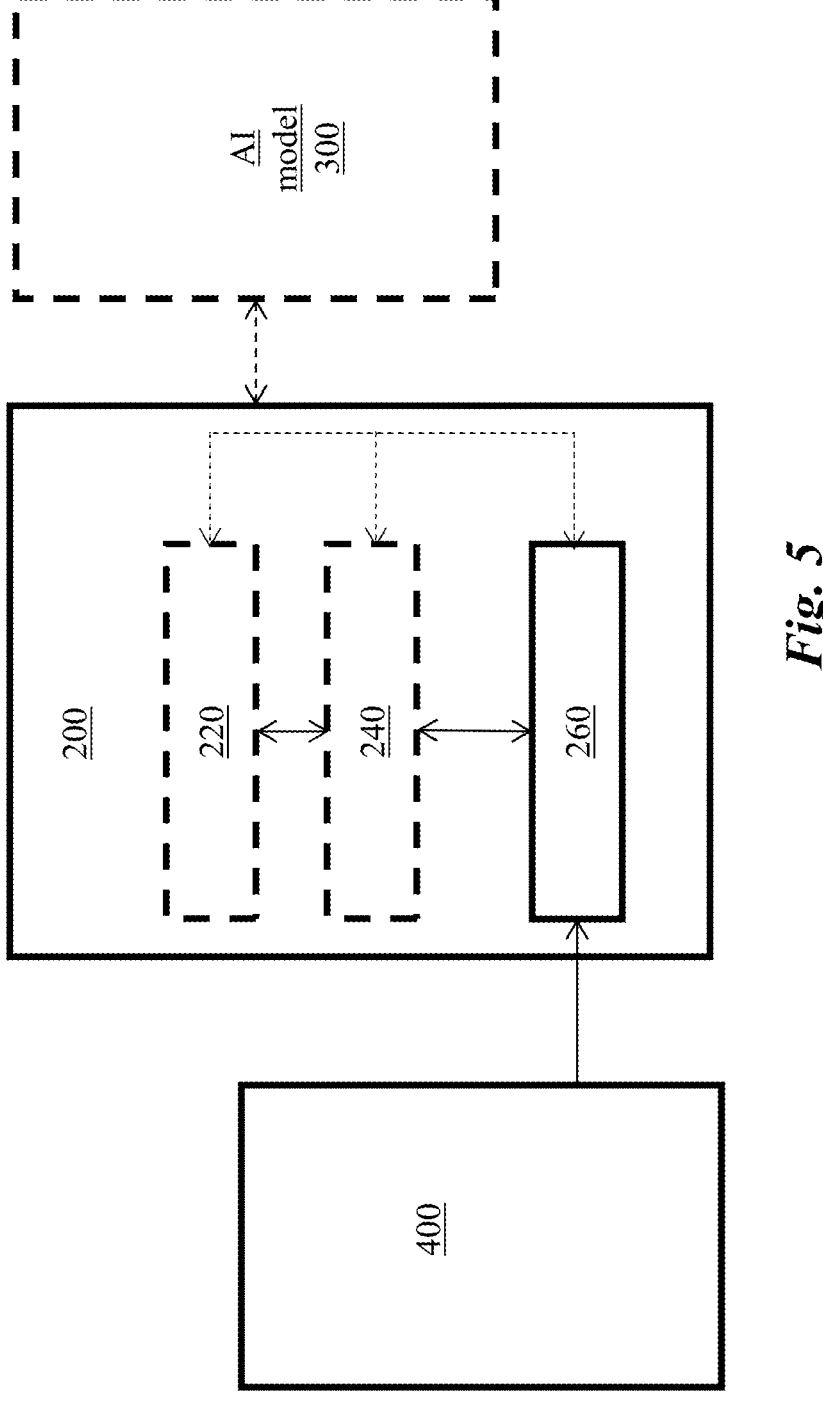
FIG. 5 is a diagram illustrating another alternative exemplary embodiment of the system of FIG. 1, wherein the system includes a fraud detection engine for receiving external data.

In various embodiments, the firewall 240 can use a machine learning model for a detection engine 260 (shown in FIG. 5).

Turning to FIG. 5, the model security system 200 is shown as including a fraud detection engine 260. The fraud detection engine 260 can receive the external data 400 and determine whether the external data 400 includes an attack. In some embodiments, the fraud detection engine 260 can include an end-to-end easily pluggable engine in the form of an API. The API can take in the external data 400, apply various feature engineering techniques automatically and output a conclusion of whether the external data 400 is fraud or not fraud.

By including the fraud detection engine 260, the model security system 200 can optionally include the model assessment engine 220 or the firewall 240. However, the model security system 200 can include both of, one of, or none of, the model assessment engine 220 and the firewall 240. In various embodiments, the fraud detection engine 260 can function to detect fraud as a standalone system without a need of the AI model 300. However, in various embodiments, a process for developing the fraud detection engine 260 may at least partially be based upon an interaction of the model security system 200, and/or any components thereof, with the AI model 300.

Fraud Detection Based on Tabular Data

The model security system 200 can be applied in a variety of areas. An exemplary area is transaction fraud, such as when a transaction is made using fraudulent information. The model security system 200 can be used extensively by both financial institutions and ecommerce companies in credit and debit card payments, bank account payments, e-payments, and mobile wallet payments.

Another exemplary area is account take-over fraud, such as when a fraudster maliciously gains access to another user's account. The model security system 200 can be used extensively by both financial institutions and ecommerce companies.

Yet another exemplary area is check fraud, similar to transaction fraud but with additional information. The model security system 200 can be inputted with images of the check in question, and/or the transaction log history, for example.

Techniques used by the model security system 200 can further be applied to general tabular data problems.

Figure 6:
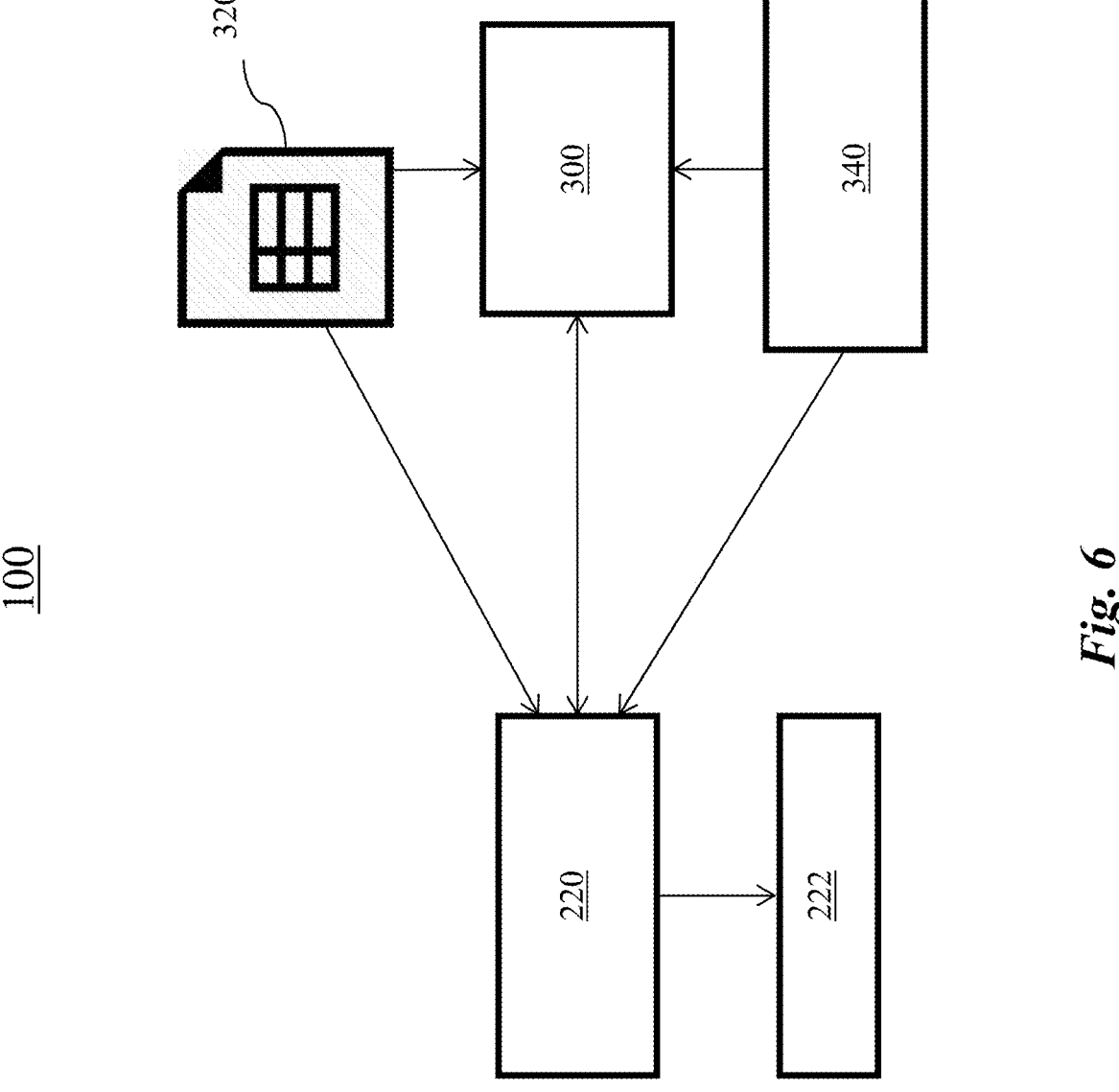
FIG. 6 is a diagram illustrating an alternative exemplary embodiment of the system of FIG. 3, wherein the sample input data includes tabular data.

Turning to FIG. 6, the sample input data 320 is shown as including tabular data. The tabular data can include information that is structured into row(s) and/or column(s). Exemplary tabular data can be in the form of numbers, alphabets, characters, symbols, and/or the like. The AI model 300 can thus include a fraud detection model for detecting fraud in the external data 400 (shown in FIG. 7).

In one embodiment, the sample input data 320 can include one or more data points. Each data point can include a set of tabular data associated with a user, an account, a transaction, or a combination thereof. The sample output data 340 can include labels respectively applied to the data points based upon the AI model 300. For example, each label can include a decision of whether the data point is "fraud" or "non-fraud." Additionally and/or alternatively, the model assessment engine 220 can obtain the access to the AI model 300.

In one embodiment, the model assessment engine 220 can output a report summarizing vulnerabilities of the AI model 300.

In various embodiments, the model assessment engine 220 can include an automated engine that acts as a fraudster. The model assessment engine 220 can simulate attacks that fraudsters might attempt and discover vulnerabilities before fraudsters do.

In various embodiments, because the AI model 300 is based on tabular data, the model assessment engine 220 can use various techniques to simulate attacks by being aware of feature dependencies across different columns.

In various embodiments, the model assessment engine 220 can use algorithmic attacks for tabular data. In one embodiment, the model assessment engine 220 can use fast submodular sampling to explore the state space.

In various embodiments, the model assessment engine 220 can apply novel methods for dealing with feature dependencies.

In various embodiments, the model assessment engine 220 can apply novel methods for dealing with categorical features.

In various embodiments, the model assessment engine 220 can use a plurality of algorithms for discovering the vulnerabilities of the AI model 300. Although adversarial ML have been studied in research, application of ML by the model assessment engine 220 to fraud detection is unique at least because the model assessment engine 220 attacks the AI model 300 trained on tabular data, which does not necessarily include images. Tabular data can present various complications that has not yet been addressed by existing techniques, the complications including, for example, categorical variables and/or feature dependencies. The model assessment engine 220 is novel at least because the model assessment engine 220 address such complications.

Figure 7:
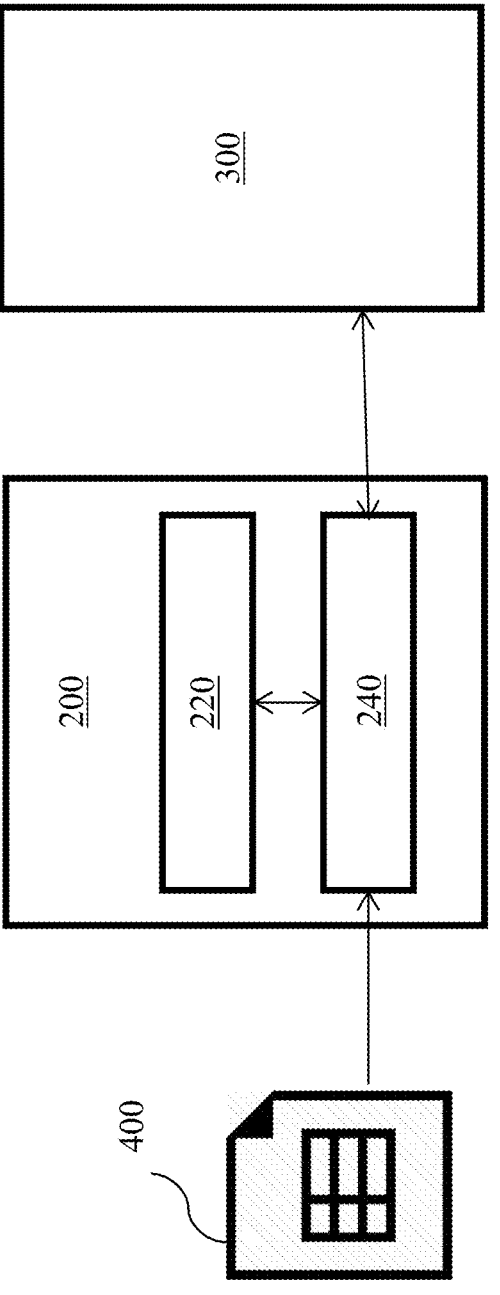
FIG. 7 is a diagram illustrating an alternative exemplary embodiment of the system of FIG. 4, wherein the external data includes tabular data.

Turning to FIG. 7, the external data 400 can include tabular data. In one embodiment, the firewall 240 can indicate whether the external data 400 include any attacks that are identified by the model assessment engine 220. Accordingly, the firewall 240 can generate an alert of a selected level based upon customized levels of alert. For example, the customized levels of alert can be determined based on severity and/or user preferences.

In various embodiments, the firewall 240 can patch the loopholes identified by the model assessment engine 220 to create an additional layer of security that stands in front of the AI model 300. Stated somewhat differently, the external data 400 can first go through the firewall 240 before going through the AI model 300. If the firewall 240 detects suspicious data, such as an attack, in the external data 400, the firewall 240 can flag the suspicious data. The firewall 240 can alert the engineers and/or data scientists with dynamically evolving behaviors of fraudsters to keep fraud detection up-to-date.

Figure 8:
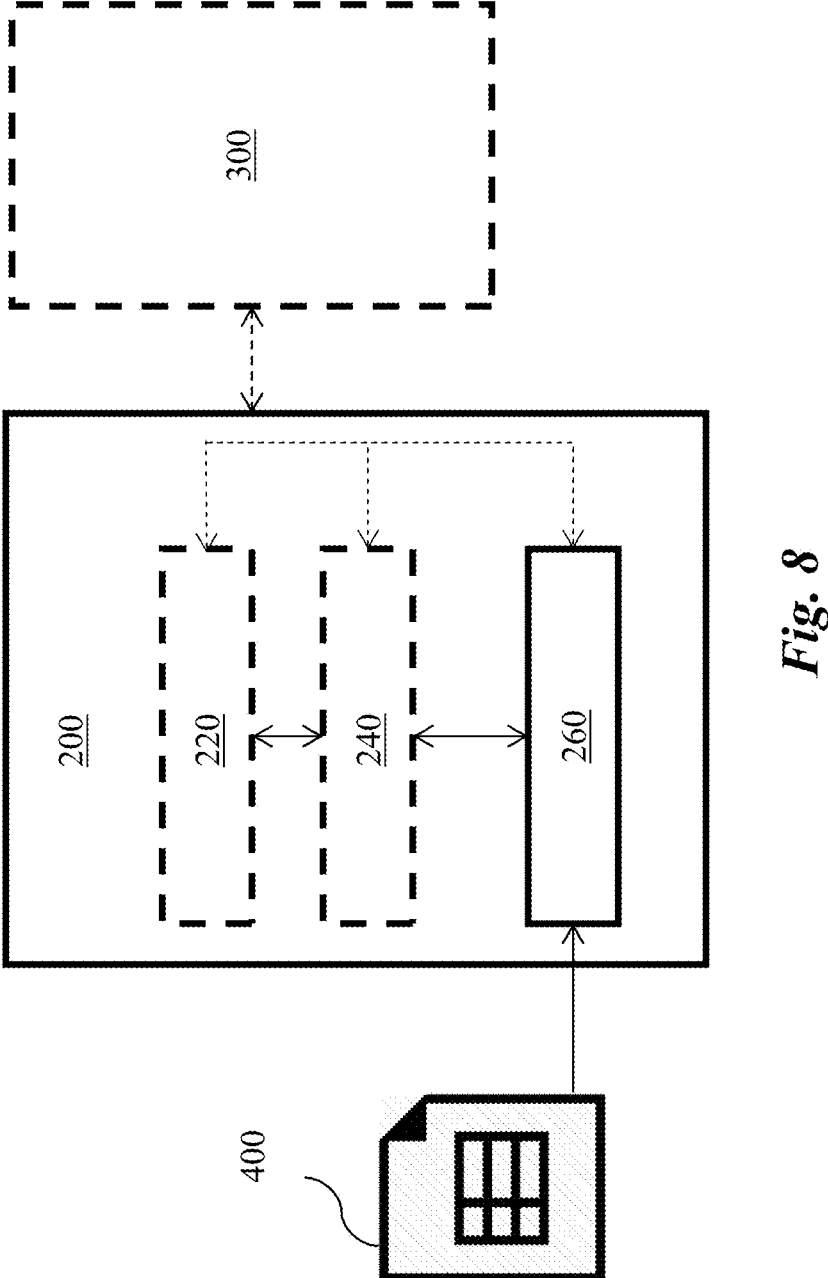
FIG. 8 is a diagram illustrating an alternative exemplary embodiment of the system of FIG. 5, wherein the external data includes tabular data.

Turning to FIG. 8, the fraud detection engine 260 is shown as receiving the external data 400 including tabular data. Exemplary external data 400 can include user transaction history, user data, account history, account data, transaction information, or a combination thereof. In one embodiment, the fraud detection engine 260 can output a probability of the external data 400 being a fraud.

In various embodiments, the fraud detection engine 260 can use ML frameworks for binary classification. Exemplary ML frameworks can include boosted trees, neural networks, and/or the like. The binary classification model can be trained on a variety of raw and/or engineered features. The binary classification model can be exposed via API and be called by sending the binary classification model the required data. The underlying binary classification model can use deep learning techniques to achieve more accurate results. The API can be engineered to be distinctly simple and easy to use.

In various embodiments, the fraud detection engine 260 can use feature engineering and/or feature selection. In one embodiment, the fraud detection engine 260 can include features based on user data and for selecting which user data is relevant for detecting fraud.

Voice Authentication

Voice authentication is a form of biometrics system that compares the incoming voice of an individual with the registered voice(s) of the person to authenticate and validate if the voices are similar. Voice authentication can be done by extracting voiceprints (for example, some key characteristics of voice as an audio waveform) and measuring similarity using various acoustic and statistical approaches.

Voice authentication can be used in places like call centers, user authentication for consumer banks and smart-home devices. The hand-free nature of voice authentication and the ease of integration (e.g., not requiring cameras, possible via a phone call) makes voice authentication useful.

However, voice authentication is vulnerable to various forms of attacks. For example, the fraudsters can mimic the voice of the person who they want to be authenticated as. The mimicking can be in the form of (1) talented voice actors mimicking the victim's voice; or (2) recording and playing the victim's voice in front of the voice authentication system (replay attacks). However, the mimicking is challenging, because, for (1), it is a manual work that requires finding the right talent; and, for (2), for voice authentication that requires dynamic conversation or specific phrases, it is hard to use the recorded voice.

Recently, voice fraud has increasingly used voice synthesis. Voice synthesis is a technology to generate fake audio from someone's voice recordings. With the recent advancement in the technology, fraudsters can generate realistically sounding audio with only few minutes of victims' recordings. Using fake voice, fraudsters can pretend to be the victim, and fool voice authentication system or even humans. For example, fraudsters can trick their colleagues to transfer large amount of money to the fraudsters' bank account.

The model security system 200 (shown in FIG. 1) is based on technologies to detect synthetic voice as set forth above.

The model security system 200 can be applied in a variety of areas. An exemplary area is trick call center authentication. Traditionally, call centers use knowledge-based authentication, where the operators asked various questions to the callers (e.g., date of birth). Recently, some call centers have migrated to using the AI models 300 for a seamless authentication. The voice authentication can save the call time by automatically authenticating the callers using the voice print as the callers speak. However, the AI models 300 can be spoofed using real time voice conversion models that converts speaker's voice to a target that the speaker wants to be recognized as.

Another exemplary area is trick voice authentication. For example, some banks use the AI models 300 to authenticate users into accounts, transfer money, purchase finance products. The AI model 300 can be spoofed with synthetic voice.

Yet another exemplary area is calls to colleagues. Synthetic voice can be used to trick people to, for example, wire transfer large amount of money to hackers.

All of the areas as set forth above can be defended with the firewall 240 (shown in FIG. 1) of the model security system 200.

Figure 9:
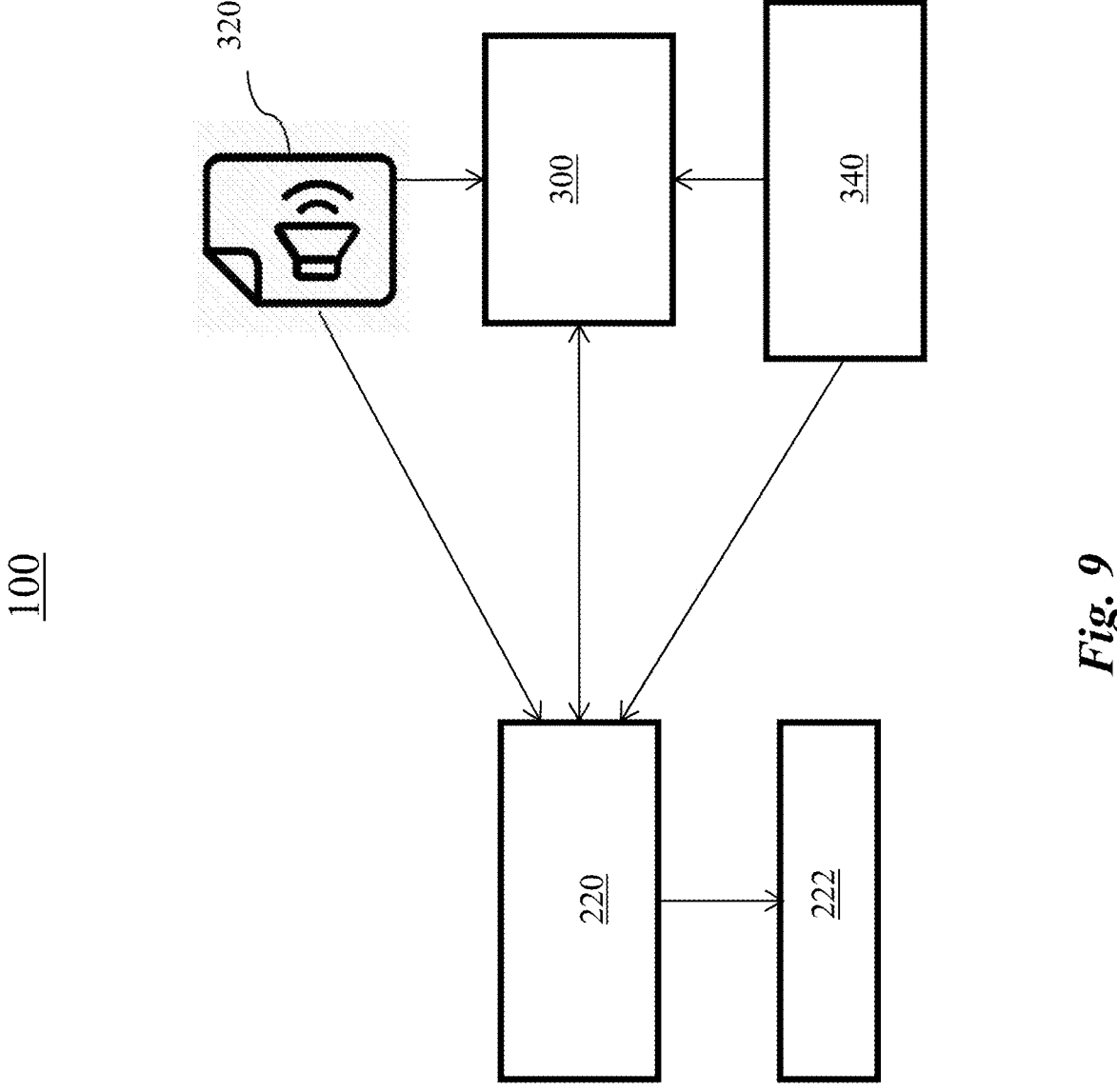
FIG. 9 is a diagram illustrating another alternative exemplary embodiment of the system of FIG. 3, wherein the sample input data includes audio data.

Turning to FIG. 9, the sample input data 320 is shown as including audio data. The audio data can include digital audio data in any suitable file format. Exemplary file format can include uncompressed audio formats (such as Waveform Audio File Format (WAV), Audio Interchange File Format (AIFF), Au file format, or raw header-less Pulse-code modulation (PCM), formats with lossless compression (such as Free Lossless Audio Codec (FLAC), Monkey's Audio (filename extension .ape), WavPack (filename extension .wv), True Audio (TTA), Adaptive Transform Acoustic Coding (ATRAC) Advanced Lossless, Moving Picture Experts Group (MPEG)-4, and Shorten (SHN)), and/or formats with lossy compression, such as Opus, MPEG Audio Layer 3 (MP3), Vorbis, Musepack, Advanced Audio Coding (AAC), ATRAC and Windows Media Audio Lossy (WMA lossy)). The AI model 300 can thus include a voice authentication model for detecting whether the external data 400 (shown in FIG. 10) is classified and/or labeled to be of a specific person.

In one embodiment, the sample input data 320 can include one or more sample audio files. The sample output data 340 can include labels respectively applied to the sample audio files based upon the AI model 300. For example, a label can indicate a person (for example, a user). The AI model 300 accepts the sample audio file as being of the person. Additionally and/or alternatively, the model assessment engine 220 can obtain the access to the AI model 300.

In one embodiment, the model assessment engine 220 can identify at least one of the sample audio files that includes synthetic audio data. Stated somewhat differently, the simulated attack data 222 can include the sample audio file that includes the synthetic audio data.

Additionally and/or alternatively, the model assessment engine 220 can generate at least one red team audio file. The red team audio file can include a selected sample audio file of the sample audio files that is added with noise. The AI model 300 recognizes the selected sample audio file as being of a first person. The noise is added to the selected sample audio such that the AI model 300 recognizes the red team audio file as being of a second person that is different from the first person. Stated somewhat differently, the simulated attack data 222 can include the red team audio file. Additionally and/or alternatively, the red team audio file can be generated by the model assessment engine 220 without being based on the sample audio files.

In various embodiments, the model assessment engine 220 can generate synthetic voice, and/or add noise to the audio data, to trick the AI model 300 into misclassifying a voice from person A as a voice from person B. In some embodiments, the noise can be imperceptible to the AI model 300.

Figure 10:
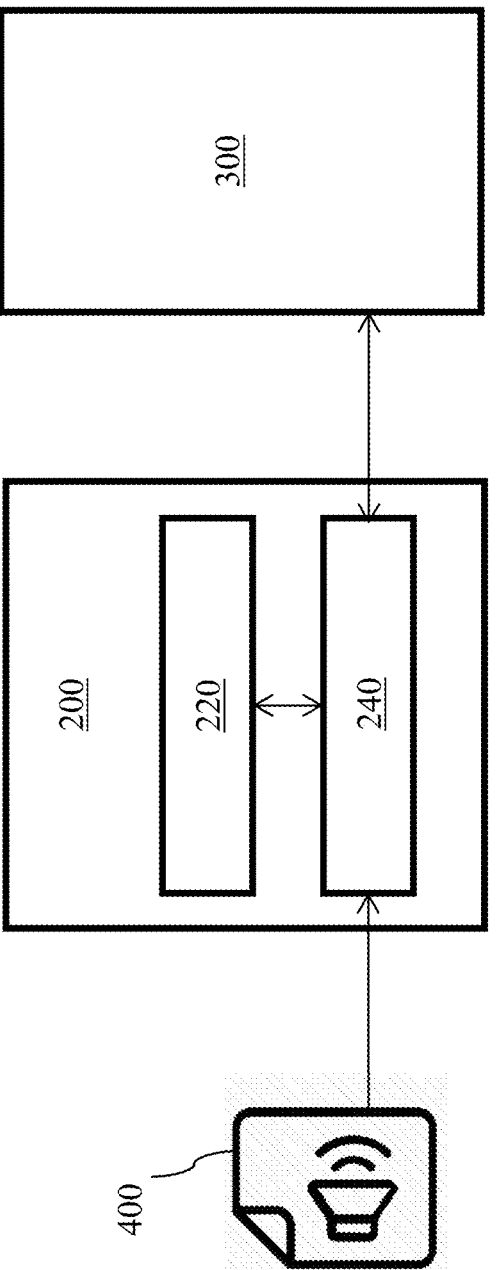
FIG. 10 is a diagram illustrating another alternative exemplary embodiment of the system of FIG. 4, wherein the external data includes audio data.

Turning to FIG. 10, the external data 400 can include audio data. In one embodiment, the external data 400 can include one or more audio files that are synthetic or authentic. In various embodiments, being synthetic can include being entirely synthetic and/or at least partially synthetic. Being not synthetic can include being authentic, real, legitimate, unmodified, unmanipulated, untampered-with, or a combination thereof. In one embodiment, the firewall 240 can indicate whether a voice presented in the external data 400 is synthetic or not.

Additionally and/or alternatively, the external data 400 can further include identification and/or label applied to each of the audio files. In one embodiment, the firewall 240 can indicate whether the identification and/or label is correctly applied to the audio file. Stated somewhat differently, the firewall 240 can include a classifier that is not susceptible to any external data 400 that include incorrect identification of the voice in the audio file, the incorrect identification being adversarial and able to attack the AI model 300.

In various embodiments, the firewall 240 can include a voice synthesis detection model that uses various feature extraction methods from speech data, and/or fine-tuned architecture specific to the voice synthesis detection model.

In various embodiments, the firewall 240 can include a binary classification machine learning model that is trained to generate an output label indicating whether the audio data is spoof or non-spoof.

In various embodiments, the firewall 240 can use a convolutional neural network based architecture for the voice synthesis detection model.

In various embodiments, the firewall 240 can implement feature extraction. When the audio data cannot be fed into the voice synthesis detection model "as is," the firewall 240 can extract a variety of acoustic features that are well-suited for voice synthesis detection.

In various embodiments, the firewall 240 can have a data augmentation technique to generate synthetic voice from a real voice.

The voice synthesis detection model can wrongly acquire features or characteristics that are not real (or good) to learn, and such features or characteristics are not necessarily spoofed. For example, if an authentic audio file happens to have more female voices than male voices, the voice synthesis detection model can be trained to, when the audio data is female, predict the audio data as being real. However, such a result is merely a coincidence in the data used in training. In various embodiments, the firewall 240 can have a way to regularize the voice synthesis detection model so that the voice synthesis detection model does not wrongly pick up such data distribution patterns.

In various embodiments, the firewall 240 can include a detector that is trained with a significant amount of authentic and synthetic audio datasets. Additionally and/or alternatively, the detector can be trained with additional audio data generated using state-of-the-art synthetic voice generation techniques, and/or the modification thereof, that are suited for data augmentation in the specific instance of synthetic voice detection.

Additionally and/or alternatively, software can be developed around the detector for deployment. The software can be easy and seamless to install on specific voice authentication systems to put synthetic voice detection into production.

In various embodiments, the model security system 200 can detect spoofed voice from phones with 95% detection accuracy and 0.01% false positive rate, which is greater than performance of conventional systems.

Facial Recognition

Facial recognition algorithms can be used to determine which person is in a given photo. Facial recognition algorithms can be an extension of facial detection algorithms. Facial detection algorithms can determine whether or not a person is present without ascertaining the identity of the individual if there is an identity. In some embodiments, the firewall 240 can measure whether an image contains a human face.

Facial recognition algorithms can involve extraction of features and classification of features. For example, facial landmark analysis can extract features such as the features around the nose, eyes, cheeks (or any feature that can distinguish the human face from other objects) and return the features as points.

Alternative feature-extraction algorithms can include Local Binary Patterns and Eigenfaces, which can return vectors or arrays as numerical descriptors of the face. Statistical methods, such as histogramming or Principal Component Analysis, can be employed to separate the feature vectors, and to accordingly distinguish faces from one another. Other alternative techniques can include speeded up robust features (SURF) and scale-invariant feature transform (SIFT).

Some computer vision techniques can use deep learning models to produce the feature vectors (or "embeddings") from images. Advancements have been made to separate the feature vectors. Stated somewhat differently, the better the feature vectors belonging to different people can be separated, the more certain the identity of the person that the vector belongs to can be determined.

Cloud services for offering facial recognition capabilities can use the computer vision techniques as set forth above. The model security system 200 can expose and safeguard against vulnerabilities in the AI model 300 that is deployed by a cloud service. The model security system 200 can add imperceptible noise such that the AI model 300 can misidentify individuals, even without knowledge of what model is being used in the attack. The model security system 200 can deploy a detector which can determine whether images that are, or to be, fed into the AI model 300 is clean or tampered with.

The model security system 200 can be applied in a variety of areas. In various embodiments, at border checkpoints, the model security system 200 can identify individuals of interest who are crossing secure borders including, for example, through airports.

In various embodiments, for bank identification, the model security system 200 can identify and match individuals to bank information associated thereto, allowing for quick withdrawal and easy access to the money of the individuals.

In various embodiments, for law enforcement, the model security system 200 can search for and identify individuals of interest in security camera and traffic camera footage.

In various embodiments, for travel authorization, the model security system 200 can identify a person going through travel checkpoints to check whether he/she is trusted or not, and if he/she is trusted, the model security system 200 can expedite the travel checkpoint process.

In various embodiments, for contactless checkout, the model security system 200 can identify individuals going into a store and automatically charge the individuals for items purchased by the individuals.

In various embodiments, for sporting events, the model security system 200 can keep track of players on the field and provide real-time tracking and information and/or statistics.

Figure 11:
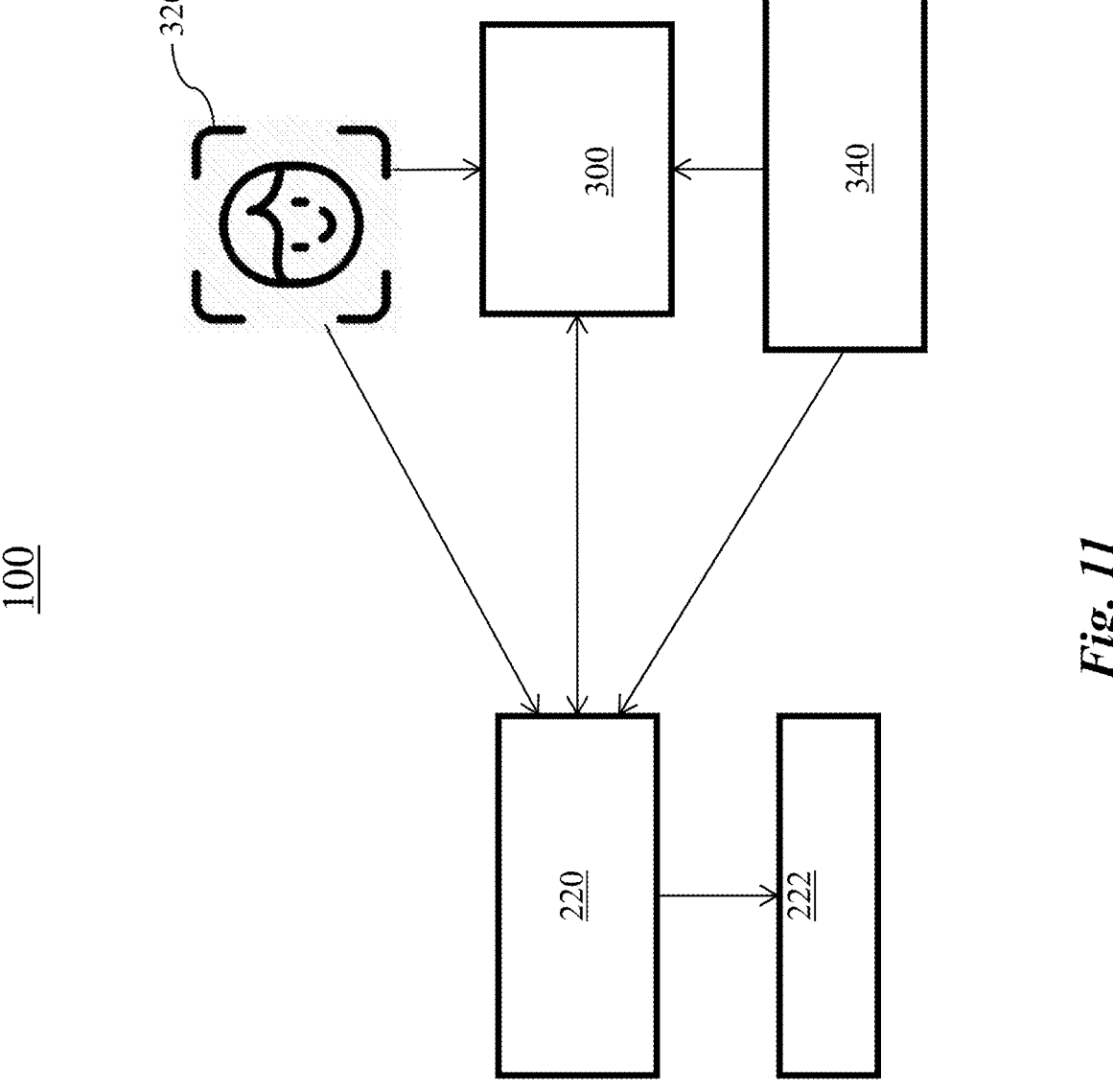
FIG. 11 is a diagram illustrating another alternative exemplary embodiment of the system of FIG. 3, wherein the sample input data includes one or more images for facial recognition.

Turning to FIG. 11, the sample input data 320 is shown as including one or more images each being of a face. The images can include computer-readable still images and/or video in any suitable file format. Exemplary file format can include Joint Photographic Experts Group (JPEG), Graphics Interchange Format (GIF), bitmap (BMP), Tagged Image File Format (TIFF) and/or Portable Network Graphics (PNG). The AI model 300 can thus include a facial recognition model for detecting whether the external data 400 (shown in FIG. 12) shows a face of a specific person.

In various embodiments, the sample input data 320 can include one or more sample image files. The sample output data 340 can include labels respectively applied to the sample image files based upon the AI model 300. For example, a label can indicate a person (for example, a user). The AI model 300 accepts the image audio file as being of the person. Additionally and/or alternatively, the model assessment engine 220 can obtain the access to the AI model 300.

In one embodiment, the model assessment engine 220 can identify at least one of the sample image files that is misclassified and/or mislabeled by the AI model 300. The misclassifying can include misclassifying toward a specific label (for example, a specific label as selected or specified by an attacker), and/or misclassifying toward a label that is different from the original label. Stated somewhat differently, the simulated attack data 222 can include the sample image files that are misclassified.

Additionally and/or alternatively, the model assessment engine 220 can obtain one or more images of a target person. The target person can include any one selected person. An exemplary target person can include a label that is chosen by the attacker among the sample output data 340. Stated somewhat differently, the target person can include a label that is misclassified toward, and/or an original label of a sample image file that is misclassified. In various embodiments, the model assessment engine 220 can generate one or more red team image files each including an image of the target person. The red team image files can be synthetic. In one example, the red team image files can be at least partially photorealistic. In another example, the red team image files can include the images of the target person that are added with noise. In various embodiments, the model assessment engine 220 can create an image of any form that can serve the purpose of fooling the AI model 300. Some of the generated images can have photorealistic elements, but not all the generated images are limited to photorealistic images. The AI model 300 can recognize the red team image file as being of a person different from the target person. Stated somewhat differently, the simulated attack data 222 can include the red team image files. Additionally and/or alternatively, the red team image file can be generated by the model assessment engine 220 without being based upon the image of the target person or upon the sample image files.

In various embodiments, the model assessment engine 220 can attack the AI model 300 that is for detecting facial similarity. Stated somewhat differently, the AI model 300 can be given two photos A, B of faces and determine whether photo A and photo B are similar or not. Additionally and/or alternatively, the model assessment engine 220 can attack the AI model 300 that is for detecting facial identification. Stated somewhat differently, the AI model 300 can be given a photo of a face and classify the face to a specific person. For both types of AI models 300, the model assessment engine 220 can add small noise to trick the AI model 300 even if the AI model 300 is state-of-the-art.

In various embodiments, the model assessment engine 220 can use algorithmic attacks to measure and evaluate the robustness of the AI models 300 to state-of-the-art attacks.

In various embodiments, based upon evaluation by the model assessment engine 220, the model assessment engine 220 can produce a report so that user can easily assess how vulnerable the AI model 300 is and can understand which aspects of the AI model 300 is the most vulnerable. The report can be simple and interpretable.

In various embodiments, the model assessment engine 220 can use algorithmic attacks to deceive the AI model 300 even if the AI model 300 includes a state-of-the-art ML model.

Figure 12:
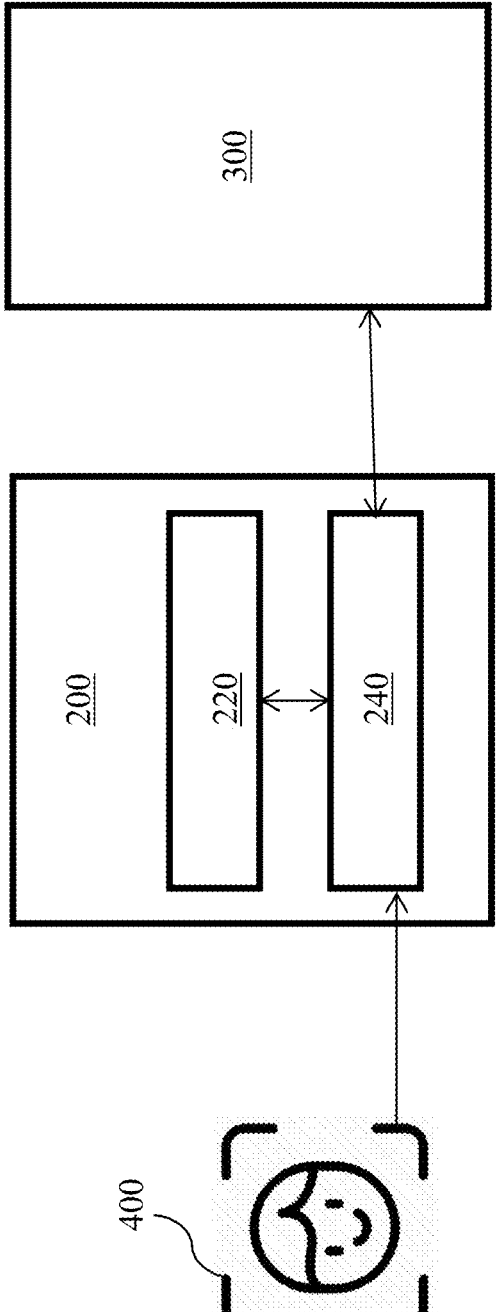
FIG. 12 is a diagram illustrating another alternative exemplary embodiment of the system of FIG. 4, wherein the external data includes one or more images for facial recognition.

Turning to FIG. 12, the external data 400 can include one or more images each being of a face. The external data 400 can further include identification and/or label applied to each of the images. In one embodiment, the firewall 240 can indicate whether the identification and/or label is correctly applied to the image. Stated somewhat differently, the firewall 240 can include a robust classifier that is not susceptible to any external data 400 that include incorrect identification of the image, the incorrect identification being adversarial and able to attack the AI model 300.

Additionally and/or alternatively, the external data 400 can include one or more image files that are synthetic (or machine-generated, or machine-manipulated) or authentic. Stated somewhat differently, the image file can include a photo of a real face, or include an image of a face that is synthetic (or machine-generated). The external data 400 can further include a category that the image file belongs to. In one embodiment, the categories can include "real face" and "machine-generated face." In various embodiments, the firewall 240 can indicate whether the face in the image file is real or machine-generated. For example, the firewall 240 can include a robust detector for determining the correct category of the image file.

In various embodiments, the firewall 240 can protect the AI model 300 against deficiencies of the AI model 300 as identified by the model assessment engine 220.

In various embodiments, the firewall 240 can receive the external data 400 and output whether the external data 400 is a legitimate face image or a face images that has been attacked.

In various embodiments, the firewall 240 can use a model specifically architected for facial recognition and/or image recognition. The model can be trained over large collections of legitimate face images and attacked images. An attacked image can include an authentic image that is altered for attacking the AI model 300. In one embodiment, the attacked images can be created by the model assessment engine 220.

In various embodiments, the firewall 240 can implement liveness detection. For example, the firewall 240 does not recognize the face as authentic if the external data 400 is a still image of the face, or detects a person else wearing a mask of the face, even though both of such images can appear to the camera as the face. The firewall 240 can detect both of such types of attacks (i.e., presenting a picture of an individual and/or wearing a mask of an individual).

In various embodiments, the firewall 240 can deploy a software platform on-premise and/or in the cloud to act as a firewall layer before potentially adversarial inputs are fed into the AI model 300. The firewall 240 can be customized with deep learning models which serve as the detector(s) which can determine whether an input is adversarial or harmless, and send the response back to an operator. The detector can function with high availability and low latency. API keys can be provided to an operator to specify which detectors, classification and/or services that the operator can access.

In various embodiments, the detector of the firewall 240 can be built using deep machine learning techniques.

In various embodiments, the model security system 200 can expose and/or attack the AI model 300 using various techniques. Exemplary techniques can include open-source facial recognition algorithms, neural-network based face embedding algorithms, and/or the like.

In various embodiments, the model security system 200 can expose and/or attack methods for training the AI model 300 by compressing face images into effective lower dimensional embeddings.

In various embodiments, the model security system 200 can expose and/or attack methods for training the AI model 300 by separating those embeddings into categories to serve as facial recognition algorithms.

In various embodiments, the model security system 200 can use methods to trick facial recognition algorithms by adding a small amount of noise to an image of a face.

In various embodiments, the model security system 200 can use neural-network based methods to produce specific images of faces from noise (e.g., with a generative adversarial network).

In various embodiments, the model security system 200 can use methods to make existing deep-learning based facial recognition models more robust to fake inputs.

Object Detection

Object detection can be used for identifying objects in an image. Exemplary object detection can be gun detection. Gun detection is detecting whether there is a gun in an image.

Some object detection systems can use deep learning techniques. A machine learning model can be trained over a large number of images containing the objects that the model should detect. In contrast to other image classification techniques, object detection models can specify the location in the image of the detected objects.

A cloud service can provide object detection products. For example, the cloud services can provide an API that detects objects in images uploaded by users.

Similarly to other ML models, ML models for object detection are vulnerable to attacks. Imperceptible carefully-crafted noise added to an image can deceive the model into not detecting an object that is in an image. The model security system 200 can expose, and safeguard against, vulnerabilities in the AI model 300. The AI model 300 can be deployed by a cloud service.

The model security system 200 can be applied in a variety of areas. In various embodiments, for autonomous vehicles, object detection based on the model security system 200 can be used to detect other vehicles, traffic signs, pedestrians and/or other objects so that the vehicle can adapt direction.

In various embodiments, for gun detection and/or security, object detection based on the model security system 200 can be used to identify anomalies in a certain location, such as guns or bombs.

In various embodiments, for people counting, object detection based on the model security system 200 can be used to estimate the number of people in a given location.

In various embodiments, for sports, object detection based on the model security system 200 can be used to track the ball and players.

Figure 13:
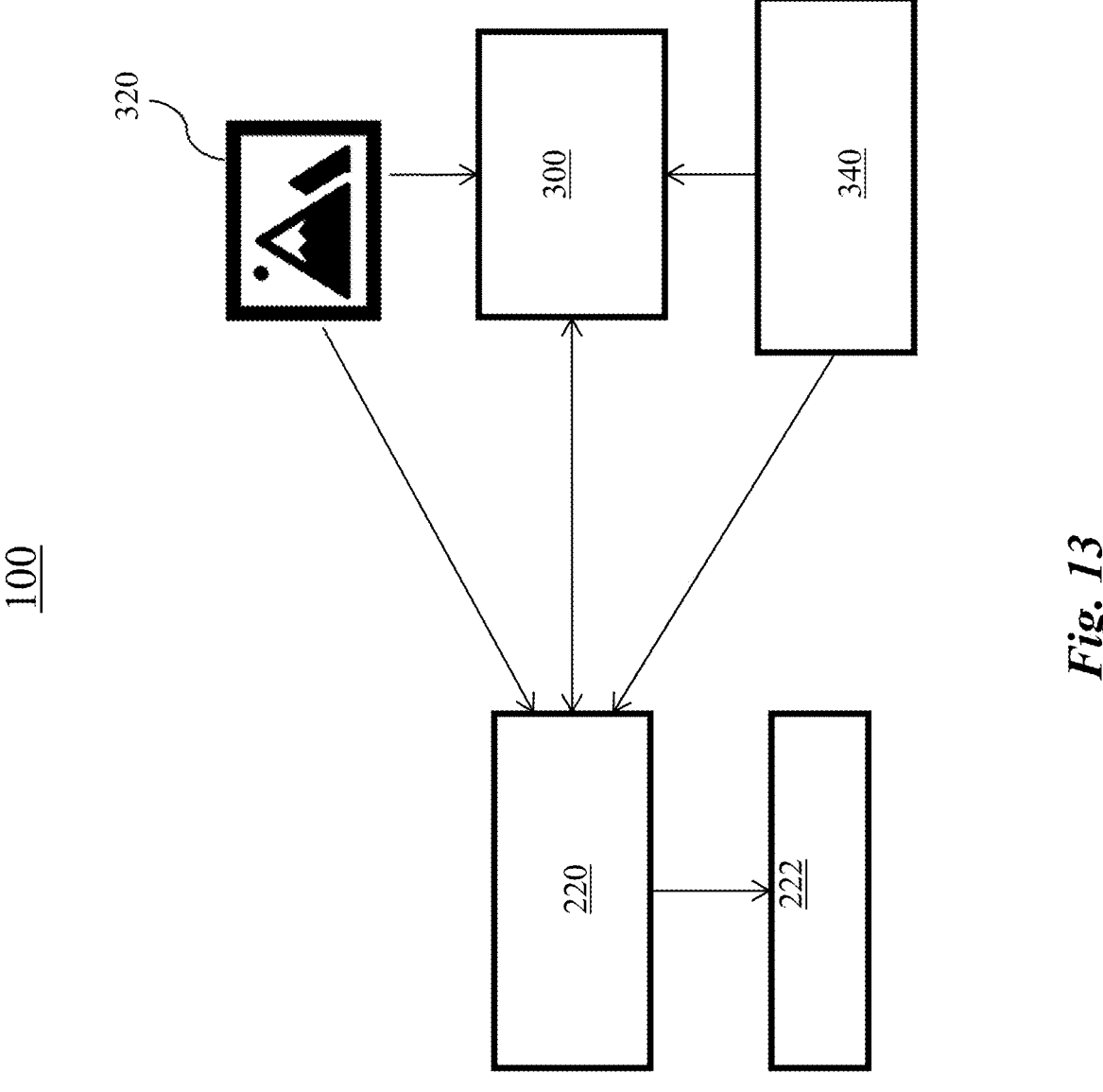
FIG. 13 is a diagram illustrating another alternative exemplary embodiment of the system of FIG. 3, wherein the sample input data includes one or more images for object detection.

Turning to FIG. 13, the sample input data 320 is shown as including one or more images each presenting one or more objects. The images can include computer-readable still images and/or video in any suitable file format. The AI model 300 can thus include an object detection model for classifying objects in an image contained in the external data 400 (shown in FIG. 14). The classifying can include detecting the objects, and/or locations thereof, in the image.

In various embodiments, the sample input data 320 can include one or more sample image files. In various embodiments, the sample output data 340 can present the one or more objects, and locations thereof, respectively in each of the sample image files based upon the AI model 300. Additionally and/or alternatively, the model assessment engine 220 can obtain the access to the AI model 300.

In one embodiment, the model assessment engine 220 can generate a report of robustness and/or deficiencies of the AI model 300. The report can be simple and easy-to-interpret for an operator. In various embodiments, the model assessment engine 220 can perform a set of preconfigured tests on the AI model 300 and associated data. Each one of the tests can measure the vulnerability of the AI model 300 across a specific axis, and the model assessment engine 220 can generate the report based on the results of these tests.

Additionally and/or alternatively, the model assessment engine 220 can identify at least one of the sample image files that has deceived, or can deceive, the AI model 300. Stated somewhat differently, the simulated attack data 222 can include the sample image files identified by the model assessment engine 220.

Additionally and/or alternatively, the model assessment engine 220 can generate the red team image file by manipulating the sample image file. Each of the red team image file can deceive the AI model 300. The AI model 300 can classify objects correctly in the sample image file but can incorrectly classify the objects in the red team image file. Stated somewhat differently, the simulated attack data 222 can include such a red team image file.

Additionally and/or alternatively, the red team image file can be generated by the model assessment engine 220 without being based upon the sample image files. Stated somewhat differently, the simulated attack data 222 can include the red team image files.

In various embodiments, the model assessment engine 220 can attack images and videos, both digitally and physically, and trick the AI model 300. Digital adversarial attacks can be similar to attacks to facial recognition where the model assessment engine 220 can add noise to images of objects such that the AI model 300 classifies the objects as different objects. The noise can be small. Physical adversarial attacks can include attacks where people can print out special stickers, for example, to put on various objects (e.g., guns) to prevent the AI model 300 from correctly classifying the objects.

Figure 14:
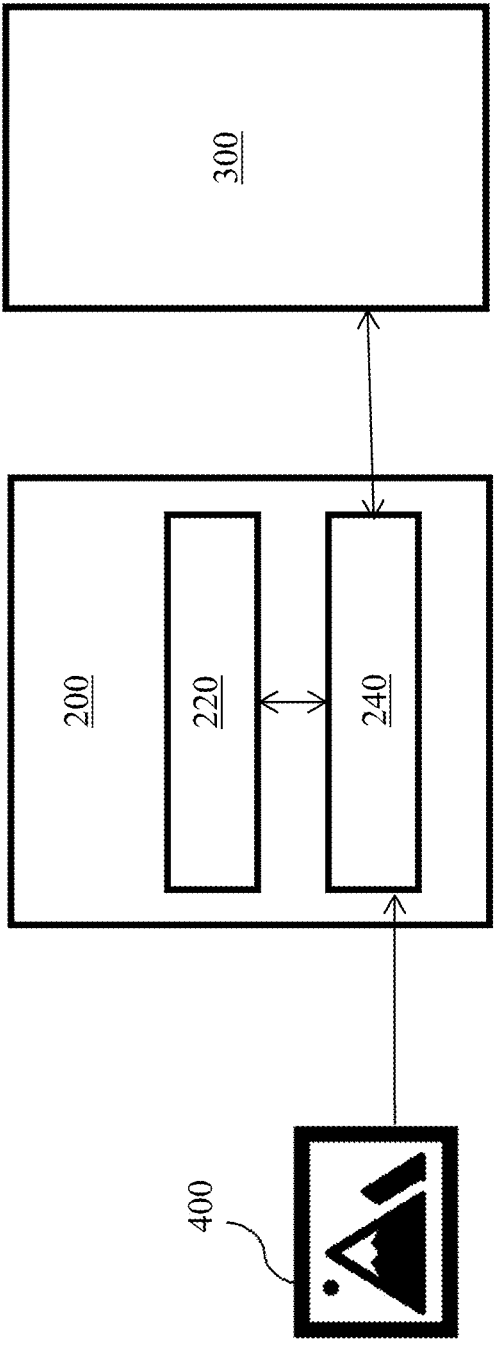
FIG. 14 is a diagram illustrating another alternative exemplary embodiment of the system of FIG. 4, wherein the external data includes one or more images for object detection.

Turning to FIG. 14, the external data 400 can include one or more images each showing one or more objects. In various embodiments, the firewall 240 can protect the AI model 300 against deficiencies of the AI model 300 as identified by the model assessment engine 220.

Additionally and/or alternatively, the external data 400 can include one or more image files. The firewall 240 can indicate whether the image file is manipulated to deceive the AI model 300. In one embodiment, the firewall 240 can generate a confidence number indicating whether the image file is a legitimate (or real, or authentic) image, an image that has been manipulated to deceive the AI model 300 via a digital and/or physical adversarial attack.

In various embodiments, the firewall 240 can use a model specifically architected for object detection. The model can be trained over large collections of legitimate images of objects and/or of attacked images. In one embodiment, the attacked images can be created by the model assessment engine 220.

Exemplary Applications for Fraud Detection Based on Tabular Data

AI attacks using tabular data can include the following:
1) Fake reviews and purchases to artificially boost a product or seller's ranking;

2) Fake accounts created to take advantage of sign-up promotions/bonuses;

3) Fraudulent product listings that might convince a transactional AI platform into allow a listing to be displayed that would subsequently defraud a buyer;

4) Engagement attacks generating artificial clicks, installations, and app engagement metrics;

5) Fraudulent transactions using skimmed credit cards; and

6) Fraudulent credit card and bank account openings from stolen and/or fake identities.

Tabular data, which constitute 10-15% of all existing data, are used for many transactions as a basis for approval or access. The model security system 200, and/or the fraud detection engine 260 (shown in FIG. 8) can detect whether a given transaction is fraudulent or not. The external data 400 that are inputted into the fraud detection engine 260 can include a vector of data describing a transaction. The fraud detection engine 260 can implement several steps. The data can be normalized. Feature selection can be performed to reduce the number of features. One or more models including, for example, deep neural networks and/or gradient boosted decision trees can be used to generate a variety of predictions. The individual predictions can be ensembled together to generate a final score. The output of the fraud detection engine 260 can include a fraud score, for example, ranging between 0 and 100, with a score of 100 meaning it is very likely that the transaction is fraudulent. Data problems such as preparation, cleaning, error detection, and missing value imputation are applications where an AI environment can be used to make large scale decisions and where exploits (or attacks) can be introduced.

In various embodiments, a neural network can include a technology for simulating activities of the human brain. Exemplary activities can include pattern recognition and/or the passage of input through various layers of simulated neural connections. A deep neural network can include one or more networks that have an input layer, an output layer and at least one hidden layer in between. Each layer can perform specific types of sorting and/or ordering in a process of "feature hierarchy." "Deep learning" can characterize functions of the deep neural networks, because the deep learning can represent a form of machine learning where technologies use AI to classify and/or order information in a manner that is more complex than simple input/output protocols.

In various embodiments, a gradient boosted decision trees can include algorithm-based machine that uses boosting methods to combine individual decision trees. Boosting can include combining a learning algorithm in series to achieve a strong learner from many sequentially connected weak learners. In case of gradient boosted decision trees algorithm, the weak learners can include decision trees. Each tree can minimize the errors of previous tree. Trees in boosting are weak learners, but adding many trees in series with each tree focusing on the errors from a previous tree can make boosting a highly efficient and accurate model. Unlike bagging, boosting does not involve bootstrap sampling.

The model security system 200 can address various aspects of system flexibility, including data augmentation and data modeling for training defensive data detectors, integration with recursive training whenever possible to leverage all the data received by the AI defense (also comprising using techniques such as validating input data using other submitted values or other data sources), and unique system optimization and learning local models to allow for both scalable deployments and accommodation of unique data sets with multiple data output.

Exemplary tabular data exploit can include the following.

For bank loan approval, loan approval is an essential process for banking organizations. This process is used to either approve or reject customer loan applications. Recovering loans is a major contributing factor in the financial statements of a bank and approving the right loan application is therefore very important. The AI model 300 can be useful in making these decisions based on customer data filled onto the application such as earning potential, collateral value, current liquidity or age.

In an exemplary situation, the AI model 300 rejects an application from an individual. The individual is inclined to get the loan approved and therefore provides the bank with false information in order to mislead the AI model 300 into approving the application. In order to evade getting caught for bank fraud it is required that the false information is imperceptible for humans and should remain relevant and credible if a potential expert verifies the application. This requires the exploit to be imperceptible to human review or at least time consuming to catch by a human. Thus, the exploit must manipulate the subordinate variables used that a human would normally not catch if an application is flagged for human review. The exploit may require at least partial knowledge of the AI model 300 to determine what features are of less importance to the AI model 300. The exploit would focus on modifying the values of the features of less importance to the AI model 300 across a spectrum such that a human review of the various features to detect fraud would require a longer time period. Correspondingly modifications on more important features will result in a higher attack perceptibility and allowing the attack to be more easily be detected by a human reviewer. Additionally, it is also essential that each feature in the adversarial attack retains the relevance and credibility of the original instance. This can be achieved by verifying that each modified feature preserves its natural constraints and types. The loan applications that use more variables in the AI model 300 are more susceptible to an attack as a human reviewer is less likely to base their review on the combinations of several tabular data pieces. Also, the attack must maintain a full view coherence that is not required in manipulation of pixel data. If an exploit model does not satisfy the inter-relationships of the data, the human reviewer might also more easily question the result. The exploit model can include a machine-learning model that is used for generating the external data 400 that attack the AI model 300. Thus, the exploit models must exist in the variable noise factors (e.g., an address cannot be outside a ZIP code, or a professional title exist outside of an educational level). Stated somewhat differently, with the human reviewer, fraud via tampering with inter-relationships of data can be more easily detected, but fraud via the variable noise factor is not easily detected. The model security system 200 can prevent such fraud by looking at the relationship between various variable noise factors to determine the legitimacy of a specific input row.

Implementation of the Model Security System 200

Figure 15:
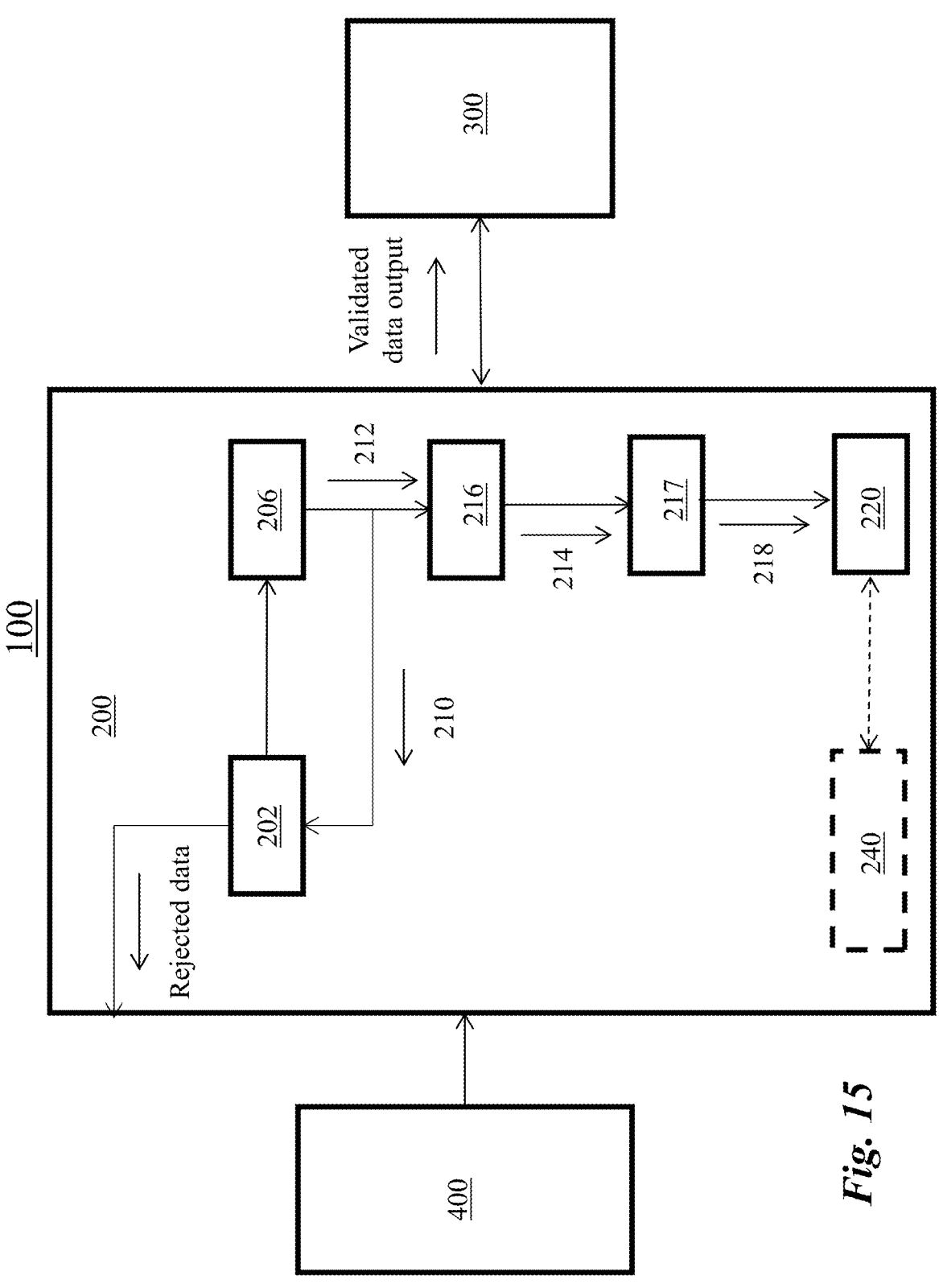
FIG. 15 is a diagram illustrating exemplary data processing of the model security system of FIG. 1.

FIG. 15 shows the model security system 200 using AI to analyze fraud threats to the AI model 300. Exemplary AI models 300 can be used for telehealth, e-commerce, prescription systems, financial transfer systems or other systems that can receive one or more tabular data sets that are variable. The model security system 200 can receive non-tabular data as well. Examples of non-tabular data can include, handwriting samples, images, audio speech, and/or biometric inputs. The model security system 200 can have one or more sets of operating machines that allow the model security system 200 to interact with entities in a cloud infrastructure environment and/or via a hardware machine in the case of an offline device, such as an item scanner.

In a cloud environment, the model security system 200 can include an intake machine 202 that receives data from the external AI world via API call and/or hardwired connection. The model security system 200 can deploy a set of models that can be customized to data feed(s) of the external data 400. The data feeds can be used by the AI model 300. The model security system 200 can test the external data 400 for compliance or conformance with expected threshold parameters. In various embodiments, the external data 400 that are outside of normally expected parameters can be shunted to a resolution machine 206. The resolution machine 206 can use selected models to resolve the sets of data into classes of erroneous data (or mistaken data) 210 and/or suspicious data 212. Because the suspicious data 212 can include data that are not discernable to a reviewing person, the suspicious data 212 can be passed to a display machine 216 to allow a reviewer to adequately review the suspicious data 212 and determine source and outcome of the suspicious data 212. The reviewer can use the results from the model security system 200 on the given data to more easily determine the validity of the given data. The erroneous data 210 can be passed back to the intake machine 202 to be rejected.

Additionally and/or alternatively, near-threshold data 214 can be sent to a testing machine 217. The near-threshold data 214 can include data that are close to acceptable and/or slightly over the set thresholds. The testing machine 217 can identify patterns and/or other recurring data within the near-threshold data 214. Each of the identified pattern can be an exploit pattern 218. Once the testing machine 217 determines a pattern, the testing machine 217 can create data parameters to identify various thresholds to the pattern to understand better whether the model security system 200 is vulnerable to this type of exploit. The testing machine 217 can pass the exploit pattern 218 to the model assessment engine 220.

Conventional red teaming is testing of computer systems with penetration testing and vulnerability fraud assessment. Even though red teaming is an exercise in finding possible vectors for attack, penetration testing is an exercise in actually attacking the system. Further, conventional vulnerability fraud assessment is about analyzing software and exposing coding flaws which can be exploited. Conventional vulnerability fraud assessment studies mostly individual software and lacks the broader view of the system as a whole, focusing more on code flaws and less on system configuration and business processes. While the outcome of penetration testing practically implements the red teaming, the attack vectors provided via the penetration testing are very narrow and often doesn't say much about the system overall.

In contrast to techniques of conventional red teaming, the model security system 200 can use modeling of an exploit pattern 218 characteristics and behaviors (e.g., by the model assessment engine 220), modeling the AI model 300 from a systemic perspective, attack plan construction via simulation, and/or issues related to conducting red teaming. The current disclosure sets forth how the model assessment engine 220 can detect and draft attack plans that utilize multiple vulnerabilities across the AI model 300 rather than isolated vulnerabilities.

In accordance with the current disclosure, model assessment can be used in the context of the model assessment engine 220 that can continuously test the AI model 300 to understand where the AI model 300 is the weakest. The AI model 300 can be the weakest at a level of the near-threshold data 214. Thus, by implementing the continuous testing of the near-threshold data 214, the model security system 200 can aggressively improve abilities thereof to act as a virtual data firewall for the suspicious data 212.

Additionally and/or alternatively, in the cloud environment, the model security system 200 can access a large number of models in order to review the external data 400 received. The external data 400 can contain alteration in a manner such that the AI model 300 can misinterpret and/or misclassify the external data 400.

Additionally and/or alternatively, the model security system 200 can be used in a standalone mode as a hardware component for various devices. In this configuration, the model security system 200 can be embedded in a mobile device, a computer application, and/or a hardware appliance that can be placed between the external data 400 and the AI model 300 as set forth above.

Figure 16:
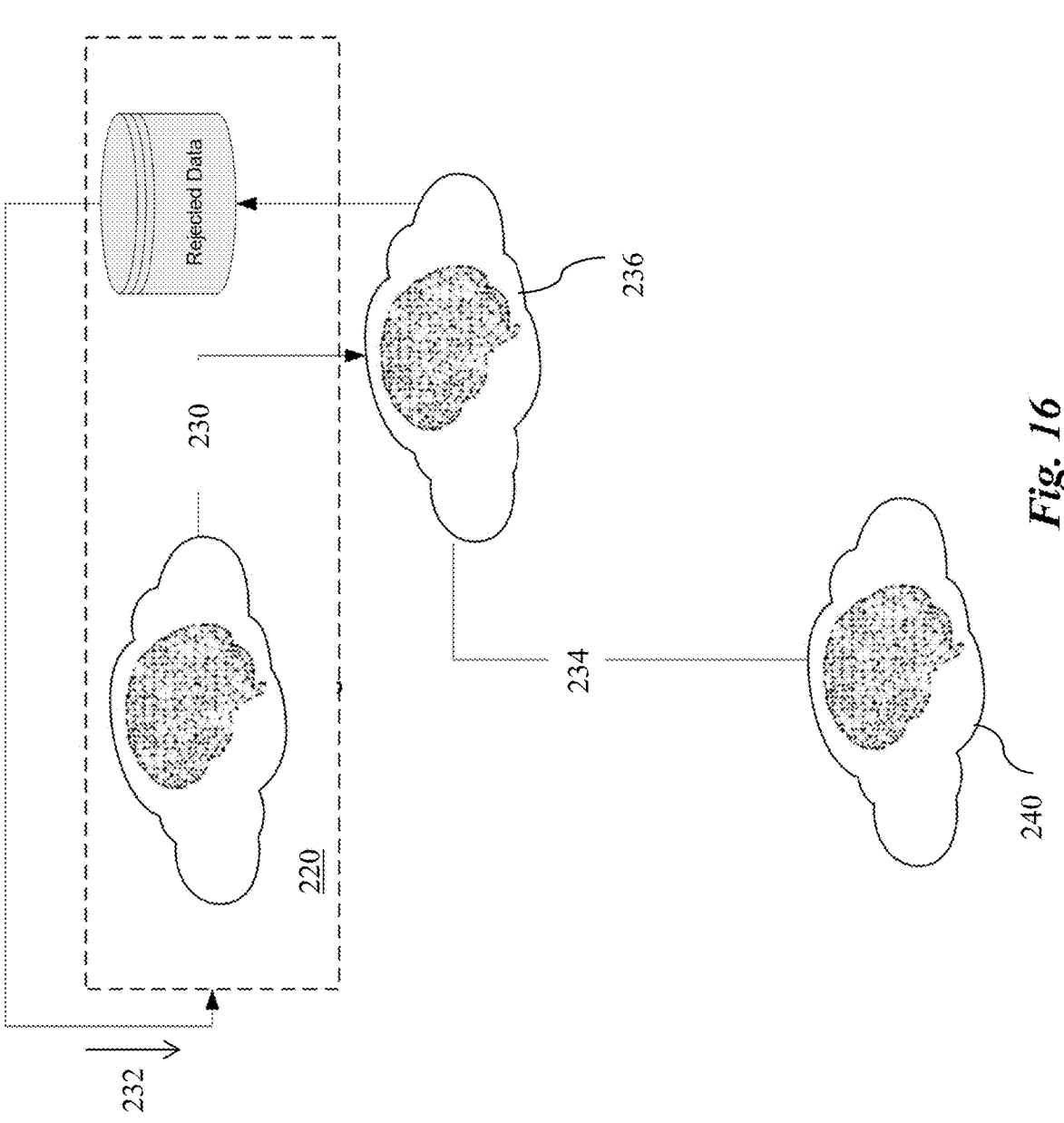
FIG. 16 is a diagram illustrating exemplary training of the model security system of FIG. 1.

FIG. 16 illustrates training and use of the model security system 200, according to various embodiments. The model security system 200 can be trained via machine-learning algorithms, programs, and/or tools, and can be used to perform operations associated with fraud or attack detection of the AI model 300 (shown in FIG. 1). The model security system 200 can operate by building a model from training data 232 in order to make data-driven predictions or decisions expressed as outputs and/or successful exploit models 234. Exemplary decisions can include determining the training data 232 as being "false positive fraud result." Although example embodiments are presented with respect to a few machine-learning tools, the principles presented herein may be applied to other machine-learning tools especially when discussing detection of suspicious data that are submitted to the AI model 300 and that are designed to change the result in a fraudulent manner.

The model assessment engine 220 can take the training data 232 and generate exploit models 230 that are tested on the AI testing machine 236. When the exploit models 230 are tested, variations that create a positive result against the AI testing machine 236 can be evaluated to determine whether the positive result is a false positive or a result that is intended by the AI testing machine 236. When new successful exploit models 234 are discovered, the firewall 240 can be updated to defend against the successful exploit models 234.

In some embodiments, one or more machine-learning tools can be used. For example, Logistic Regression (LR), Naive-Bayes, Random Forest (RF), neural networks (NN), matrix factorization, and Support Vector Machines (SVM) tools can be used for classifying or scoring at least a single data feed to the ML programs to perform attack by the exploit model 230 and on the AI model 300 on a discrete set of data in the data feed(s).

ML can be used for solving classification problems and regression problems. Classification problems, also referred to as categorization problems, aim at classifying items into one of several category values (for example, is this object an apple or an orange?). Regression algorithms aim at quantifying some items (for example, by providing a value that is a real number). Regression analysis can measure the strength of cause-and-effect relationships in structured data sets. Regression analysis can become more sophisticated when applied to fraud detection due to the number of variables and size of the data sets. Regression analysis can provide value by assessing the predictive power of individual variables or combinations of variables as part of a larger fraud strategy. The model security system 200 can predict whether a new transaction is fraudulent or not. In some embodiments, the model security system 200 can be specific to a particular trained customer base, but can be applied to general use. The model security system 200 can utilize classification and/or regression to identify fraudulent attacks at different points in the solution.

Figure 17:
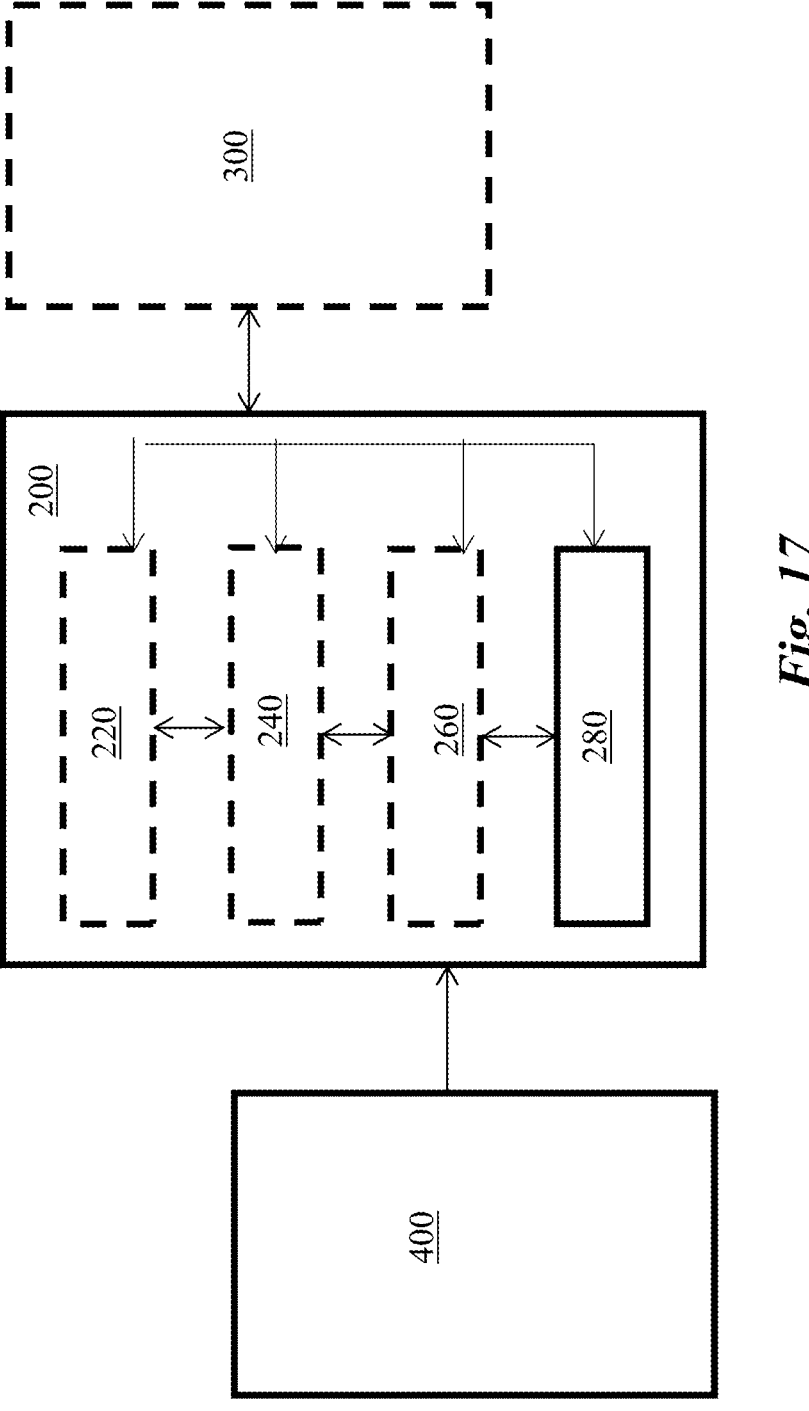
FIG. 17 is a diagram illustrating another alternative exemplary embodiment of the system of FIG. 1, wherein the system includes a sanitizer machine.

In FIG. 17, another set of machine-learning tools used in a variant of the solution can be in a form of a sanitizer machine 280. The sanitizer machine 280 can detect dirty and/or manipulated data by understanding the dependencies between types of data being submitted to the AI model 300. An exemplary application can be a financial transaction that is based on a number of data inputs. The data inputs, including addresses, phone numbers and/or other aspect of the individual data inputs, can be characterized as a vector of data describing a transaction. The data points in the vector related to each other in subtle ways. For example, an unresolved address can use a phone number and/or area code to help determine whether the address varies in a way such that an address and the phone number thereof may flag a fraudulent submission. The sanitizer machine 280 can create a graph representing dependencies between different data points associated with a transaction. The model security system 200 can compare the external data 400 to the graph and flag the external data 400, depending on how many dependencies the external data 400 violates. The output of the comparison can include a score between 0 and 1 representing how clean the data are.

Additionally and/or alternatively, the sanitizer machine 280 can be used for analyzing the data feed(s) to discover aberrant or fraudulent aspects of the data feed(s) of the external data 400. Each of the features of the external data 400 can be broken into a set of an individual measurable properties of a phenomenon that is observed. Exemplary phenomenon can include near-threshold data, and/or combinations of threshold data feeds. A feature can be related to an explanatory variable used in statistical techniques such as linear regression. Choosing informative, discriminating, and independent features is important for the effective operation of the ML programs in pattern recognition, classification, and regression. Features may be of different types, such as numeric features, strings, and graphs.

Additionally and/or alternatively, the model security system 200 can identify various tabular and/or non-tabular data exploits. The tabular data exploits can be based on tabular data that can use one or more weighting systems and that are modified and/or corrupted in a manner that the AI model 300 can register a false result based on training of the AI model 300.

Figure 18:
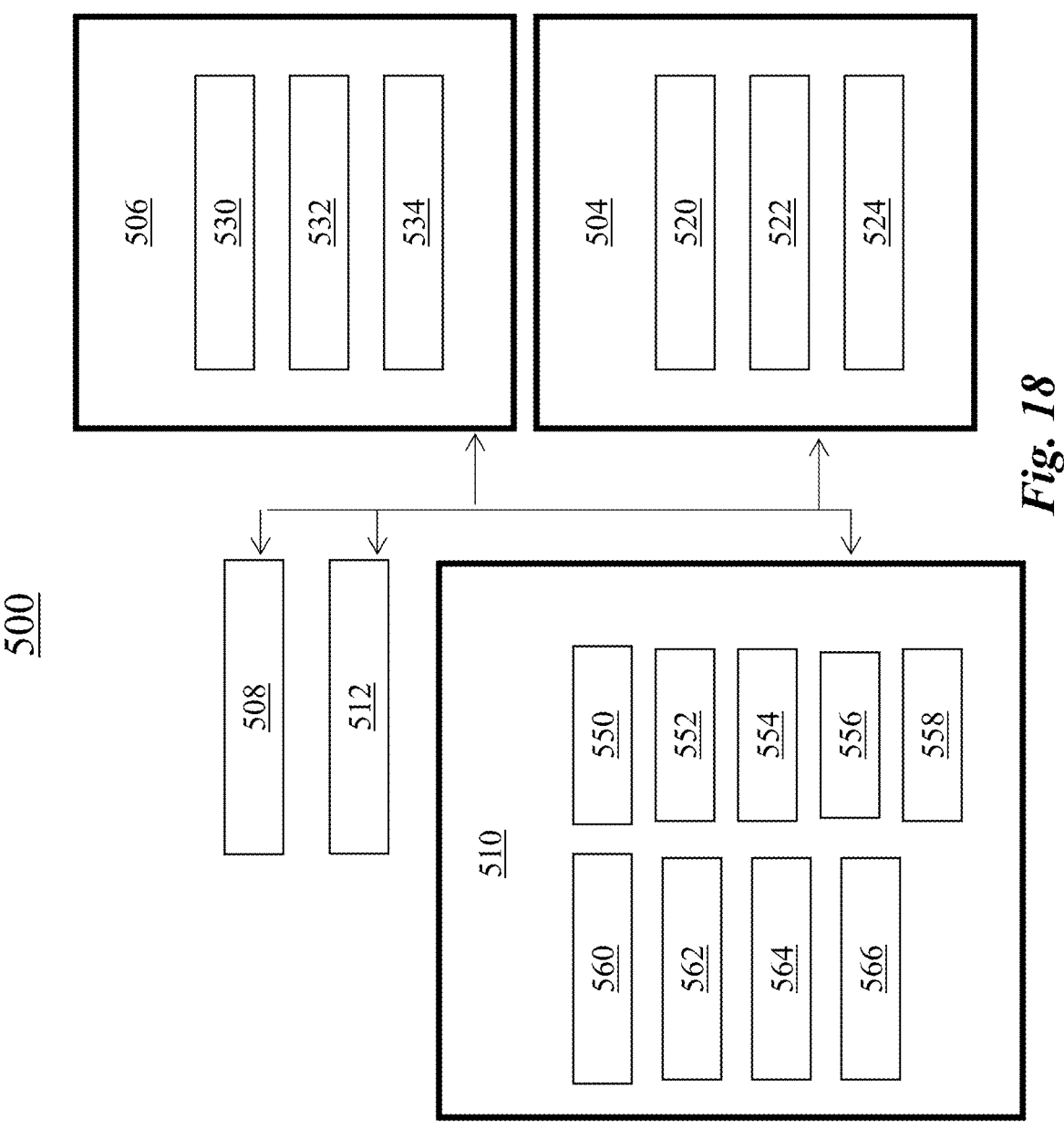
FIG. 18 is a diagram illustrating an exemplary embodiment of a software architecture for implementing the model security system of FIG. 1.

FIG. 18 is a block diagram illustrating a software architecture 500, which can be installed on any one or more of the devices described above. FIG. 18 is merely a non-limiting example of a software architecture, and it will be appreciated that many other architectures can be implemented to facilitate the functionality described herein. In various embodiments, the software architecture 500 is implemented by hardware such as a machine 600 of FIG. 19.

In this example architecture, the software architecture 500 can be conceptualized as a stack of layers where each layer may provide a particular functionality. For example, the software architecture 500 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 19:
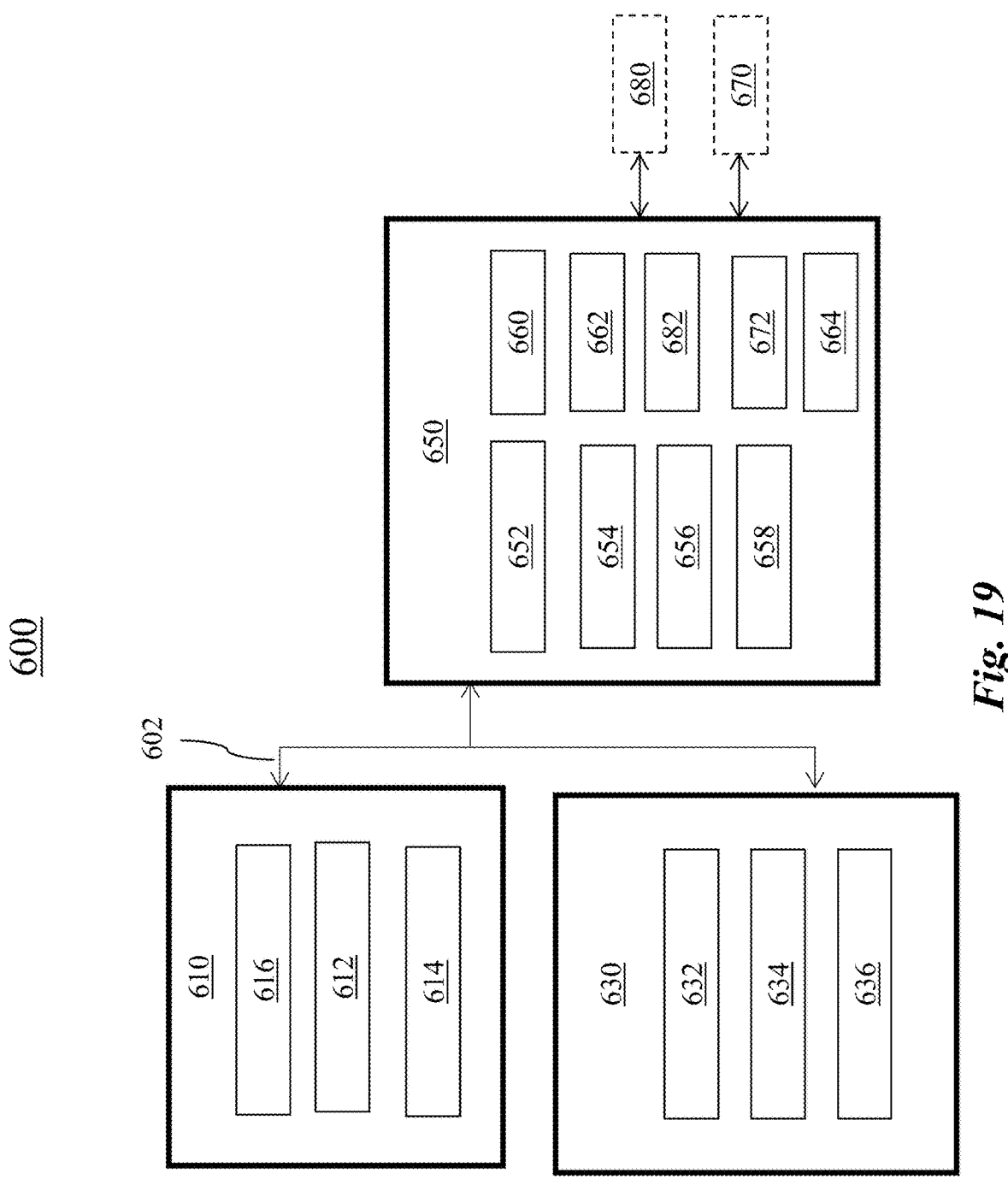
FIG. 19 is a diagram illustrating an exemplary embodiment of a machine for implementing the model security system of FIG. 1.

FIG. 19 illustrates a diagrammatic representation of a machine 600 in the form of a computer system within which a set of instructions may be executed for causing the machine 600 to perform any one or more of the methodologies discussed herein, according to an example embodiment. Specifically, FIG. 19 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 2. Additionally, or alternatively, the instructions 616 may implement FIGS. 1 and 3-18. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a key board, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as quick response (QR) code, Aztec code, Data Matrix, Dataglyph, MaxiCode, PDF417, Ultra Code, Uniform Code Council Reduced Space Symbology (UCC RSS)-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices: magnetic disks such as internal hard disks and removable disks: magneto-optical disks; and compact disc read-only memory (CD-ROM) and digital versatile disc-read only memory (DVD-ROM) disks. The terms "machine-storage media," "computer-storage media," and "device-storage media" specifically exclude carrier waves, modulated data signals, and other such media, at least some of which are covered under the term "signal medium" discussed below:

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including third generation (3G), fourth generation wireless (4G) networks, Universal Mobile Telecommunications System (UMTS), High-Speed Packet Access (HSPA), World-wide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Embodiments of this solution may be implemented in one or a combination of hardware, firmware and software. Embodiments may also be implemented as instructions stored on a computer-readable storage device, which may be read and executed by at least one processor to perform the operations described herein. A computer-readable storage device may include any non-storing information in a form readable by a machine (e.g., a computer). For example, a computer-readable storage device may include read-only memory (ROM), random-access memory (RAM), magnetic disk storage media, optical storage media, flash-memory devices, cloud servers or other storage devices and media. Some embodiments may include one or more processors and may be configured with instructions stored on a computer-readable storage device. The following description and the referenced drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for securely deploying an artificial intelligence (AI) model, comprising:

attacking, by a model assessment engine, at least one
substitute model using training data, wherein the at
least one substitute model represents a surrogate of the
AI model;

identifying, by the model assessment engine and in
response to attacking the at least one substitute model,
one or more deficiencies of the AI model;

receiving, by the model assessment engine, external data,
wherein the external data appears outside of distribu-
tion of the training data;

determining, by the model assessment engine, whether the
external data indicates a fraudulent attack based at least
in part on the one or more deficiencies; and protecting, by the model assessment engine, the AI model
from the fraudulent attack by the external data based
upon the said identifying, wherein said protecting com-
prises blocking said external data that has not been
validated by the model assessment engine from being
output to the AI model.

2. The method of claim 1, wherein said identifying
includes simulating one or more attacks on the AI model via
simulated attack data, wherein the simulating includes simu-
lating a plurality of parallel attacks to identify the one or
more deficiencies of the AI model based upon combinatorial
algorithms.

3. The method of claim 2, further comprising:
filtering or changing incoming data fed into the at least
one substitute model;
labeling the incoming data; and
training the at least one substitute model using the labeled
incoming data.

4. The method of claim 1, wherein:
said identifying includes:
establishing one or more baselines of model perfor-
mance and training data profiles; and
comparing, based upon the establishing, a performance
of the AI model and one or more alternative models
to select a model from the AI model and the one or
more alternative models for production deployment;
and
said protecting includes blocking one or more users
associated with the external data based upon behavioral
patterns of queries of the one or more users; or
said protecting includes using a max entropy method for
detecting attacks on the AI model, the max entropy
method including creating multiple detectors and
aggregating responses thereof.

5. The method of claim 1, wherein the external data
includes tabular data associated with user transaction his-
tory, account history, account data, user data, transaction
information, or a combination thereof.

6. The method of claim 5, wherein:
said identifying is based upon sample input data and
sample output data, the sample input data including one
or more data points and the sample output data includ-
ing labels respectively applied to the one or more data
points based upon the AI model, each of the labels
including a decision of whether a data point is fraud or
non-fraud; or
said identifying is based upon submodular sampling to
explore a state space.

7. The method of claim 5, wherein said protecting
includes generating an alert level for indicating whether the
external data include one or more attacks that can deceive
the AI model based upon said identifying.

8. The method of claim 5, further comprising generating
a probability of the external data being a fraud, wherein said generating the probability includes using one or more
machine learning (ML) frameworks for binary classification,
the one or more ML frameworks including boosted trees,
neural networks, or a combination thereof.

9. The method of claim 5, wherein said protecting
includes:
receiving the external data from a data feed associated
with a transaction, the external data including the
tabular data that define a risk attribute of an entity;
converting the tabular data into an input format;
identifying manipulation of one or more elements in the
tabular data to create a false positive result; and
rejecting the tabular data as a manipulated data set.

10. The method of claim 5, wherein said protecting
includes:
receiving the external data including the tabular data;
detecting a manipulation of the tabular data to identify a
false positive result;
determining that the false positive result would occur in
the AI model; and
alerting the AI model to flag the tabular data for human
review.

11. A system for securely deploying an artificial intelli-
gence (AI) model, comprising:
at least one hardware processor; and
a non-transitory computer-readable medium storing
instructions that, when executed by the at least one
hardware processor, instruct the at least one hardware
processor to perform operations including:
attacking, by a model assessment engine, at least one
substitute model using training data, wherein the at
least one substitute model represents a surrogate of
the AI model;
identifying, by the model assessment engine and in
response to attacking the at least one substitute
model, one or more deficiencies of the AI model:
receiving, by the model assessment engine, external
data, wherein the external data appears outside of
distribution of the training data;
determining, by the model assessment engine, whether
the external data indicates a fraudulent attack based
at least in part on the one or more deficiencies; and
protecting, by the model assessment engine, the AI
model from the fraudulent attack by the external data
based upon the said identifying, wherein said pro-
tecting comprises blocking said external data that has
not been validated by the model assessment engine
from being output to the AI model.

12. The system of claim 11, wherein said identifying
includes simulating one or more attacks on the AI model via
simulated attack data, wherein the simulating includes simu-
lating a plurality of parallel attacks to identify the one or
more deficiencies of the AI model based upon combinatorial
algorithms.

13. The system of claim 12, further comprising:
filtering or changing incoming data fed into the at least
one substitute model;
labeling the incoming data; and
training the at least one substitute model using the labeled
incoming data.

14. The system of claim 11, wherein:
said identifying includes:
establishing one or more baselines of model perfor-
mance and training data profiles; and
comparing, based upon the establishing, a performance
of the AI model and one or more alternative models to select a model from the AI model and the one or more alternative models for production deployment; and said protecting includes blocking one or more users associated with the external data based upon behavioral patterns of queries of the one or more users; or said protecting includes using a max entropy method for detecting attacks on the AI model, the max entropy method including creating multiple detectors and aggregating responses thereof.

15. The system of claim 11, wherein the external data includes tabular data associated with user transaction history, account history, account data, user data, transaction information, or a combination thereof.

16. The system of claim 15, wherein:

said identifying is based upon sample input data and sample output data, the sample input data including one or more data points and the sample output data including labels respectively applied to the one or more data points based upon the AI model, each of the labels including a decision of whether a data point is fraud or non-fraud; or said identifying is based upon submodular sampling to explore a state space.

17. The method of claim 5, wherein said protecting includes generating an alert level for indicating whether the external data include one or more attacks that can deceive the AI model based upon said identifying.

18. The system of claim 15, further comprising generating a probability of the external data being a fraud, wherein said generating the probability includes using one or more machine learning (ML) frameworks for binary classification, the one or more ML frameworks including boosted trees, neural networks, or a combination thereof.

19. The system of claim 15, wherein said protecting includes:

receiving the external data from a data feed associated with a transaction, the external data including the tabular data that define a risk attribute of an entity;

converting the tabular data into an input format;

identifying manipulation of one or more elements in the tabular data to create a false positive result; and rejecting the tabular data as a manipulated data set.

20. The system of claim 15, wherein said protecting includes:

receiving the external data including the tabular data;

detecting a manipulation of the tabular data to identify a false positive result;

determining that the false positive result would occur in the AI model; and alerting the AI model to flag the tabular data for human review.

* * * * *